(12) United States Patent
Lee et al.

(10) Patent No.: US 8,427,941 B2
(45) Date of Patent: Apr. 23, 2013

(54) REDUNDANT STORAGE VIRTUALIZATION SUBSYSTEM HAVING DATA PATH BRANCHING FUNCTIONALITY

(75) Inventors: Cheng-Yu Lee, Chung-Ho (TW); Ling-Yi Liu, Taipei (TW)

(73) Assignee: Infortrend Technology, Inc., Chung-Ho, Taipei Hsien (TW)

( * ) Notice: Subject to any disclaimer, the term of this patent is extended or adjusted under 35 U.S.C. 154(b) by 580 days.

(21) Appl. No.: 11/525,135

(22) Filed: Sep. 22, 2006

(65) Prior Publication Data

US 2007/0070887 A1 Mar. 29, 2007

Related U.S. Application Data

(60) Provisional application No. 60/596,436, filed on Sep. 23, 2005.

(51) Int. Cl.
*G06F 3/00* (2006.01)

(52) U.S. Cl.
USPC ............ 370/228; 710/38; 710/316; 714/4.1; 714/4.5

(58) Field of Classification Search ............... 711/157; 710/8, 38, 316; 714/4.1, 4.5; 370/227, 228; 340/2.1
See application file for complete search history.

(56) References Cited

U.S. PATENT DOCUMENTS

| | | | | |
|---|---|---|---|---|
| 5,696,895 A * | 12/1997 | Hemphill et al. | ............ | 714/4 |
| 6,385,681 B1 * | 5/2002 | Fujimoto et al. | ............ | 710/316 |
| 6,757,753 B1 * | 6/2004 | DeKoning et al. | ............ | 710/38 |
| 6,970,972 B2 * | 11/2005 | Hosoya | ............ | 711/113 |
| 7,127,633 B1 * | 10/2006 | Olson et al. | ............ | 714/4 |
| 7,155,546 B2 * | 12/2006 | Seto | ............ | 710/100 |
| 7,234,023 B2 * | 6/2007 | Abe et al. | ............ | 711/114 |
| 7,406,617 B1 * | 7/2008 | Athreya et al. | ............ | 714/4 |
| 7,469,307 B2 * | 12/2008 | Hosoya et al. | ............ | 710/74 |
| 7,676,600 B2 * | 3/2010 | Davies et al. | ............ | 709/250 |
| 2003/0110330 A1 | 6/2003 | Fujie et al. | | |
| 2003/0187987 A1 | 10/2003 | Messick et al. | | |
| 2003/0193776 A1 * | 10/2003 | Bicknell et al. | ............ | 361/685 |
| 2004/0107300 A1 * | 6/2004 | Padmanabhan et al. | ............ | 710/1 |
| 2004/0177218 A1 * | 9/2004 | Meehan et al. | ............ | 711/114 |
| 2005/0005062 A1 | 1/2005 | Liu et al. | | |
| 2005/0005063 A1 * | 1/2005 | Liu et al. | ............ | 711/112 |
| 2005/0259632 A1 * | 11/2005 | Malpani et al. | ............ | 370/351 |
| 2006/0048001 A1 * | 3/2006 | Honda et al. | ............ | 714/7 |
| 2006/0195624 A1 * | 8/2006 | Chikusa et al. | ............ | 710/5 |
| 2006/0236028 A1 * | 10/2006 | Tanaka et al. | ............ | 711/112 |
| 2007/0030644 A1 * | 2/2007 | Hall et al. | ............ | 361/685 |
| 2007/0255870 A1 * | 11/2007 | Chikusa et al. | ............ | 710/74 |
| 2010/0275058 A1 * | 10/2010 | Hashimoto et al. | ............ | 714/8 |

* cited by examiner

*Primary Examiner* — Ernest Unelus
(74) *Attorney, Agent, or Firm* — Munch, Geissler, Olds & Lowe, PLLC

(57) ABSTRACT

Disclosed is a redundant storage virtualization subsystem (SVS) having branching functionality. The SVS comprises a first and a second storage virtualization controller (SVC) and a physical storage device (PSD) array. A first and a second data path are provided between the first SVC and the PSD array passing through a first and a second signal integrity enhancing device (SIED), respectively, and configured as a first pair of redundant data paths. A third and a fourth data path are provided between the second SVC and the PSD array passing through the second and the first SIED, respectively, and configured as a second pair of redundant data paths. In view of the PSD array, the first and fourth data paths form a third redundant data path pair for a PSD, and the third and second data paths form a fourth redundant data path pair for a PSD.

64 Claims, 12 Drawing Sheets

REDUNDANT STORAGE VIRTUALIZATION SUBSYSTEM HAVING DATA PATH BRANCHING FUNCTIONALITY

RELATED APPLICATIONS

This application claims the priority benefit of U.S. Provisional Application Ser. No. 60/596,436, filed Sep. 23, 2005, the full disclosures of which are incorporated herein by reference.

BACKGROUND OF THE INVENTION

1. Field of the Invention

The present invention pertains to a redundant storage virtualization subsystem, and more particularly, pertains to a redundant storage virtualization subsystem having data path branching functionality.

2. Description of the Prior Art

In a redundant storage virtualization subsystem (SVS) containing a pair of SVCs connected together and configured as a redundant SVC pair, it is quite familiar to us with the connectivity of Fibre Channel Arbitrated Loop, in which multiple-device device-side IO device interconnect is used such that a plurality of devices can be directly connected in the loop. The Serial Attached SCSI (SAS) protocol, as a protocol for point-to-point serial signal transmission with lots of limitations of the protocol itself, and however, is not suitable to implement a redundant SVS in the loop connectivity.

Therefore, there is a need of a workable device-side connectivity for a SAS of the SVS.

SUMMARY OF THE INVENTION

It is a main object of the invention to provide a redundant storage virtualization subsystem (SVS) comprising: a first and a second storage virtualization controller (SVC) redundantly configured into a redundant SVC pair; a physical storage device (PSD) array; and a first and a second data path provided between said first SVC and said PSD array, and configured as a first pair of redundant data paths; and a third and a fourth data path provided between said second SVC and said PSD array, and configured as a second pair of redundant data paths; wherein when one of said first, second, third and fourth data paths is inaccessible, while one or more of the rest of said three data paths are accessible by said SVCs to said PSD array, data access by said SVCs to said PSD array is performed through a said accessible data path.

It is still another main object of the present invention to provide a computer system comprising a host entity and a redundant storage virtualization subsystem (SVS), said SVS comprising: a first and a second storage virtualization controller (SVC) redundantly configured into a redundant SVC pair; a physical storage device (PSD) array; and a first and a second data path provided between said first SVC and said PSD array and configured as a first pair of redundant data paths; and a third and a fourth data path provided between said second SVC and said PSD array and configured as a second pair of redundant data paths; wherein when one of said first, second, third and fourth data paths is inaccessible, while one or more of the rest of the three data paths are accessible by said SVCs to said PSD array, data access by said SVCs to said PSD array is performed through a said accessible data path.

It is still another main object of the present invention to provide a data access performing method for using in a redundant storage virtualization subsystem (SVS), said SVS comprising a first and a second storage virtualization controller (SVC) redundantly configured into a redundant SVC pair and a physical storage device (PSD) array; said method comprising the steps of: providing a first and a second data path configured as a first pair of redundant data paths between said first SVC and said PSD array; and providing a third and a fourth data path configured as a second pair of redundant data paths between said second SVC and said PSD array; and wherein when one of said first, second, third and fourth data paths is inaccessible, while one or more of the rest of the three data paths are accessible by said SVCs to said PSD array, data access by said SVCs to said PSD array is performed through a said accessible data path.

According to an embodiment of the present invention, when, in a said redundant data path pair, one of said data paths is inaccessible while the other of said data paths is accessible by said SVCs to said PSD array, data access by said SVCs to said PSD array through said redundant data path pair can be performed through said accessible data path.

According to an embodiment of the present invention, at least one branching board is provided, and at least one of said first and fourth data paths passes through a said at least one branching board, and at least one of said second and third data paths passes through a said at least one branching board.

According to an embodiment of the present invention, at least one of the first and fourth data paths passes through a first signal integrity enhancing device (SIED), and at least one of said second and third data paths passes through a second SIED.

According to an embodiment of the present invention, one of said first and second data path is connected to said second SVC through a backplane, and one of said third and fourth data path is connected to said first SVC through the backplane.

According to an embodiment of the present invention, a plurality of SIEDs are provided, and said first and second data paths pass through different said SIEDs, and said third and fourth data paths pass through different said SIEDs.

According to an embodiment of the present invention, said first and said second SIED each is provided on a first and a second circuit board, respectively, separate from said first and second SVCs.

According to an embodiment of the present invention, said first and second circuit boards are hot-swappable.

According to an embodiment of the present invention, in a said data path pairs, data access between said SVCs and said PSD array is performed via only one of said data paths at a time.

According to an embodiment of the present invention, said SVCs are provided in a first enclosure and said PSD array is provided in a second enclosure, said first data path and said fourth data path between said first enclosure and said second enclosure are contained in a single cable such that redundancy between said SVCs and said PSD array is achieved by said single cable.

According to an embodiment of the present invention, said first and fourth data paths are connected with a first PSD of said PSD array and configured as a third pair of redundant data paths; when, in said third redundant data path pair, one of said data paths is inaccessible while the other of said data paths is accessible by said SVCs to said first PSD, data access by said SVCs to said first PSD through said third redundant data path pair can be performed through said accessible data path.

According to one embodiment of the present invention, in the redundant storage virtualization controller pair, each of the storage virtualization controllers further comprises: a central processing circuitry for performing IO operations in response to IO requests of said host entity; at least one IO device interconnect controller coupled to said central processing circuitry; at least one host-side IO device interconnect port provided in a said at least one IO device interconnect controller for coupling to said host entity; and at least one device-side IO device interconnect port provided in a said at least one IO device interconnect controller coupled to said PSD array through a point-to-point serial-signal interconnect.

According to one embodiment of the present invention, a said host-side IO device interconnect port and a said device-side I/O device interconnect port are provided in the same IO device interconnect controller.

According to one embodiment of the present invention, a said host-side IO device interconnect port and a said device-side IO device interconnect port are provided in different said IO device interconnect controllers.

DETAILED DESCRIPTION OF THE INVENTION

Brief Introduction to Storage Virtualization

Figure 1:
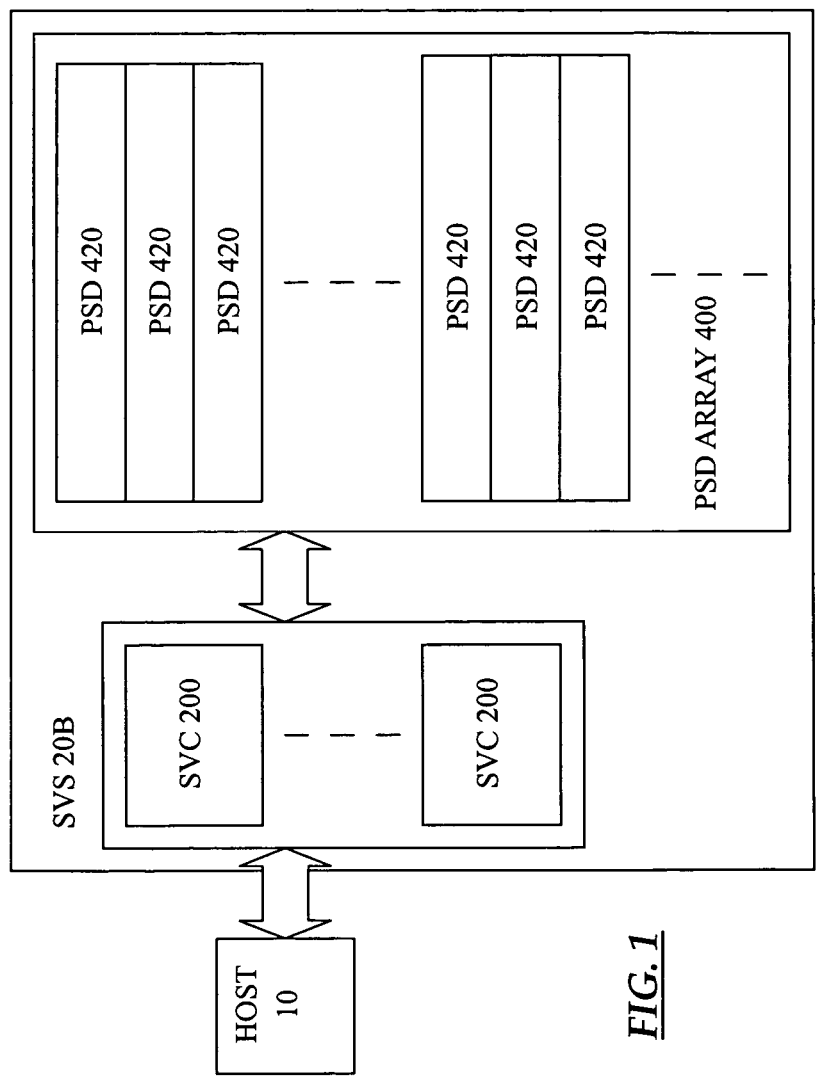
FIG. 1 is a block diagram showing a main structure of an embodiment of a system comprising a SVS having a plurality SVCs redundantly configured according to the present invention.

Storage virtualization is a technology that has been used to virtualize physical storage by combining sections of physical storage devices (PSDs) into logical storage entities, herein referred to as logical media units (LMUs), that are made accessible to a host system. This technology has been primarily used in redundant arrays of independent disks (RAID) storage virtualization, which combines smaller physical storage devices into larger, fault tolerant, higher performance logical media units via RAID technology.

A storage virtualization controller, abbreviated SVC, is a device, the primary purpose of which is to map combinations of sections of physical storage media, into logical media units visible to a host system. IO requests received from the host system are parsed and interpreted and associated operations and data are translated into physical storage device IO requests. This process may be indirect with operations cached, delayed (e.g., write-back), anticipated (read-ahead), grouped, etc., to improve performance and other operational characteristics, so that a host IO request may not necessarily result directly in physical storage device IO requests in a one-to-one fashion.

An external (sometimes referred to as "stand-alone") storage virtualization controller is a storage virtualization controller that is connected to the host system via an IO interface and that is capable of supporting connection to devices that reside external to the host system and, in general, operates independently of the host.

One example of an external storage virtualization controller is an external, or stand-alone, direct-access RAID controller. A RAID controller combines sections on one or multiple physical direct access storage devices (DASDs), the combination of which is determined by the nature of a particular RAID level, to form logical media units that are contiguously addressable by a host system to which the logical media unit is made available. A single RAID controller will typically support multiple RAID levels so that different logical media units may consist of sections of DASDs combined in different ways by virtue of the different RAID levels that characterize the different units.

Another example of an external storage virtualization controller is a JBOD emulation controller. A JBOD, short for "Just a Bunch of Drives", is a set of physical DASDs that are connected directly to a host system via one or more multiple-device IO device interconnect channel(s). DASDs that implement point-to-point IO device interconnects to connect to the host system (e.g., Parallel ATA HDDs, Serial ATA HDDs, etc.) cannot be directly combined to form a "JBOD" system as defined above for they do not allow the connection of multiple devices directly to the IO device channel. An intelligent "JBOD emulation" device can be used to emulate multiple multiple-device IO device interconnect DASDs by mapping IO requests to physical DASDs that are connected to the JBOD emulation device individually via the point-to-point IO-device interconnection channels.

Another example of an external storage virtualization controller is a controller for an external tape backup subsystem.

The primary function of a storage virtualization controller, abbreviated as SVC, is to manage, combine, and manipulate physical storage devices in such a way so as to present them as a set of logical media units to the host. Each LMU is presented to the host as if it were a directly-connected physical storage device (PSD) of which the LMU is supposed to be the logical equivalent. In order to accomplish this, IO requests that are sent out by the host, and that are to be processed by the SVC which will normally generate certain behavior in an equivalent PSD, also generate logically equivalent behavior on the part of the SVC in relation to the addressed logical media unit. The result is that the host "thinks" it is directly connected to and communicates with a PSD while in actuality, the host is connected to a SVC that is simply emulating the behavior of the PSD of which the addressed logical media unit is the logical equivalent.

In order to achieve this behavioral emulation, the SVC maps IO requests received from the host, into logically equivalent internal operations. Some of these operations can be completed without the need to directly generate any device-side IO requests to device-side PSDs. Among these, the operations are processed internally only, without ever the need to access the device-side PSDs. The operations that are initiated as a result of such IO requests will herein be termed "internally-emulated operations".

There are operations that cannot be performed simply through internal emulation and yet may not directly result in device-side PSD accesses. Examples of such include cached operations, such as data read operations, in which valid data corresponding to the media section addressed by the IO request currently happens to reside entirely in the SVC's data cache, or data write operations when the SVC's cache is operating in write-back mode, so that data is written into the cache only at first, to be committed to the appropriate PSDs in the future time. Such operations will be referred to as "asynchronous device operations", which means that any actual IO requests to device-side PSDs that must transpire in order for the requested operation to achieve its intended goal, are indirectly performed either prior or subsequent to the operation rather than directly in response to the operation.

Yet another class of operations consists of those that directly generate device-side IO requests to PSDs in order to complete. Such operations will be referred to as "synchronous device operations".

Some host-side IO requests may map an operation that may consist of multiple sub-operations of different classes, including internally-emulated, asynchronous device and/or synchronous device operations. An example of a host-side IO request that maps to a combination of asynchronous and synchronous device operations is a data read request that addresses a section of media in the logical media unit part of whose corresponding data currently resides in cache and part of whose data does not reside in cache and therefore must be read from the PSDs. The sub-operation that takes data from the cache is an asynchronous one because the sub-operation does not directly require device-side PSD accesses to complete, and however, does indirectly rely on results of previously-executed device-side PSD accesses. The sub-operation that reads data from the PSDs is a synchronous one, for it requires direct and immediate device-side PSD accesses in order to complete.

Storage virtualization subsystem may provide storage virtualization to hosts connected via standard host-storage interfaces through using a plurality of SVCs configured redundantly so that one of the SVCs will take over all the operations originally performed by another SVC in case it malfunctions. Such a storage virtualization subsystem is called a redundant storage virtualization subsystem.

Embodiments of the Invention

FIG. 1 is a block diagram that shows a main structure of an embodiment of a system comprising a host entity 10 and a redundant storage virtualization subsystem (SVS) 20 according to the present invention. The SVS 20 comprises a plurality of storage virtualization controllers (SVCs) 200 redundantly configured and a disk array attached to the SVCs 200. In such a redundant configuration, when one SVC 200 fails/malfunctions, another SVC 200 will take over all the operations normally performed by the failed/malfunctioned SVC. Although there is illustrated in FIG. 1 only one host entity 10 connected with one SVS 20, there can be more than one SVS 20 attached to the host entity 10, or more than one host entity 10 can be attached to the SVS 20. Or, more than one host entity 10 can be connected to more than one SVS 20.

The host entity 10 can be a server system, a work station, or a PC system, or the like. Alternatively, the host entity 10 can be another SVC. The SVS 20 comprises a plurality of SVCs 200 and a PSD (physical storage device) array 400. The SVCs 200 can be a RAID controller or a JBOD emulator controller, depending on the configuration of the SVS 20. Although only one PSD array 400 is illustrated here, more than one PSD array 400 can be attached to the SVC 200.

In one embodiment, the SVC 200 can be a SAS SVC, i.e., a SVC implements in a manner that complies with the SAS protocol in its device-side IO device interconnect for connecting to the disk array 400. The SVC 200 receives the IO requests and related data (the control signals and data signals) from the host entity 10 and executes the IO requests internally or maps them to the PSD array 400. The SVC 200 can be used to enhance performance and/or to improve data availability and/or to increase storage capacity of a single logical media unit (e.g., a logical disk) in view of the host entity 10. The PSD array 400 comprises a plurality of PSDs 420, such as hard disk drives (HDD), which comprises either SAS PSDs or SATA PSDs or both.

When a logical media unit in the SVS 20 is set to use a RAID level other than level 0 or 1, for example, levels 3 through 6, the PSDs 420 contains at least one parity PSD, that is, a PSD contains parity data therein and data availability, can thus be improved. In addition, the performance can be improved in execution of an IO operation when the accessed data is distributed over more than one PSD. Moreover, since the logical media unit is a combination of sections of a plurality of PSDs, the accessible storage capacity in a single logical media unit can be largely increased. For example, in a RAID subsystem of RAID level 5, the functionality described above can all be achieved. In a RAID subsystem of RAID level 6, it contains parity data that can protect against data loss due to two or more failed PSDs and increases the data availability of the storage system.

When a logical media unit in the SVS 20 is set to use a RAID level 1, the same data will be stored in two separate PSDs, and thus data availability can be greatly enhanced at the cost of doubling the PSD cost.

When a logical media unit in the SVS 20 is set to use a RAID level 0, performance improvement rather than the availability concern is the main issue and thus no enhancement of data availability is provided. Performance, however, can be greatly improved. For example, a RAID subsystem of RAID level 0 having 2 hard disk drives can have, theoretically, a performance of 200% better than a storage device having only one hard disk drive, since different data sections can be stored into the two separate hard disk drives at the same time under the control of the SVC 200.

Figure 2A:
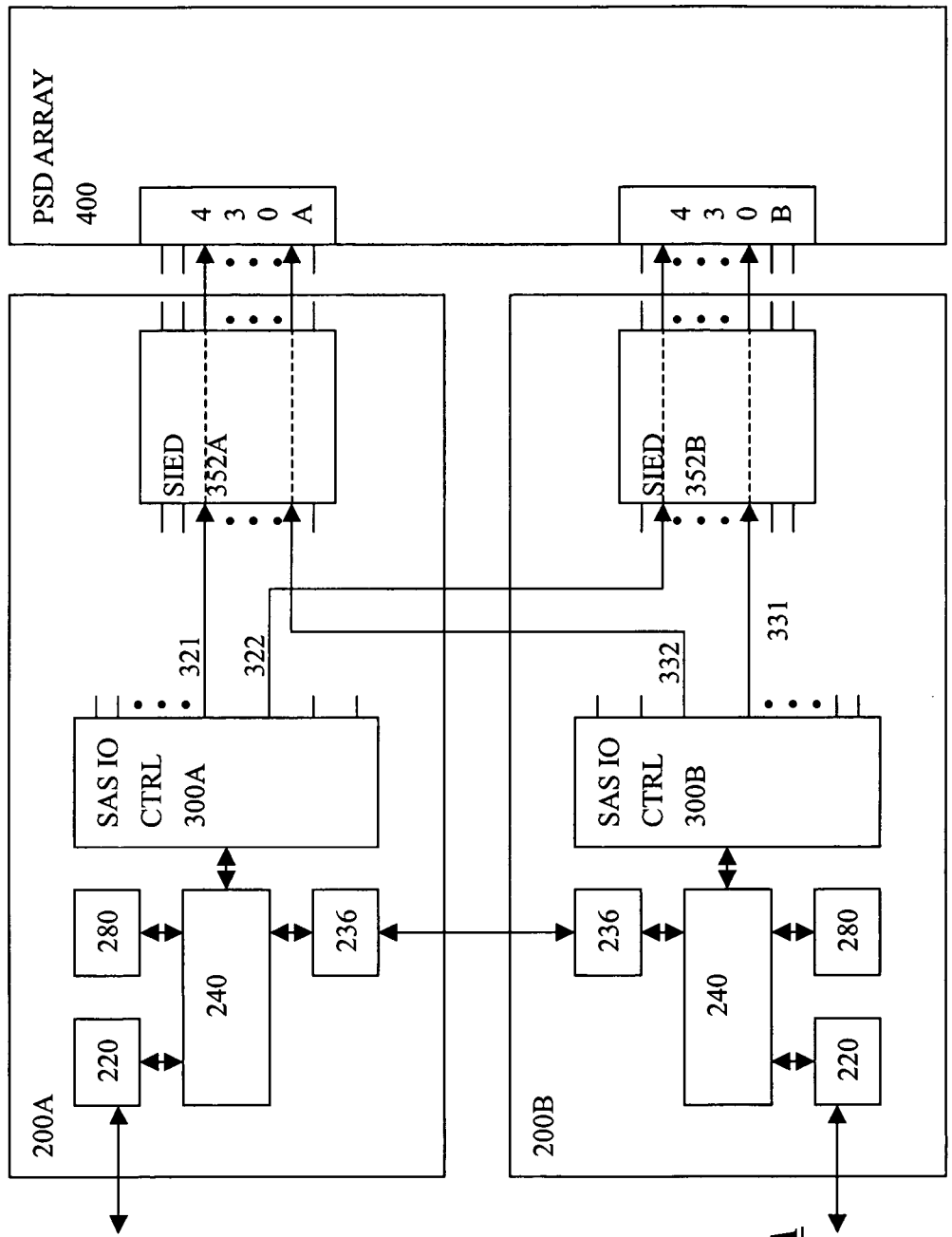
FIG. 2A is a block diagram showing a first embodiment of an SVC 200 according to the present invention.

FIG. 2A is a block diagram showing a first embodiment of a redundant SVS 20 according to the present invention. In this embodiment, two SVCs 200, SVC 200A and SVC 200B, are redundantly configured, and are connected to the disk array 400. Each of the SVCs 200 comprises a host-side IO device interconnect controller 220, a CPC (central processing circuitry) 240, a memory 280, a device-side IO device interconnect controller 300, a redundant controller communicating (RCC) interconnect controller 236, and a signal integrity enhancing device (SIED) 352. Although illustrated in separate functional blocks, two or more or even all of these functional blocks of the SVC 200 can be incorporated into one chip in practical implementation. In an embodiment of the present invention, the device-side IO device interconnect controller 300 can be a SAS (Serial Attached SCSI) IO device interconnect controller.

The host-side IO device interconnect controller 220 is connected to the host 10 and the CPC 240. The host-side IO device interconnect controller 220 is an interface and buffer between the SVC 200A and the host 10, and receives IO requests and related data from the host and maps and/or transfers them to the CPC 240. The host-side IO device interconnect controller 220 can be any one of the following protocols: Fibre/SCSI/iSCSI/LAN/SAS.

The CPC 240 mainly comprises a CPU (central processing unit) and a CPU chipset (not shown). The CPU chipset is provided to interface between the CPU and other circuitry of the SVC 200.

When the CPC 240 receives the IO requests of the host 10 from the host-side IO device interconnect controller 220, CPC 240 parses it and performs some operations in response to the IO requests, and sends the data requested and/or reports and/or information of the SVC 200A back to the host 10 through the host-side IO device interconnect controller 220.

After parsing a request received from the host 10, while a read request is received, and one or more operations are performed in response, the CPC 240 gets the requested data either internally or from the memory 280 or in both ways, and transfers them to the host 10. If the data is neither available internally nor existing in the memory 280, then IO request will be issued to the PSD array 400 through the SAS IO device interconnect controller 300, and the requested data will be transferred from the PSD array 400 to memory 280 and then passed to the host 10 through host-side IO device interconnect controller 220. When a write request is received from the host 10, after parsing the request and performing one or more operations, the CPC 240 gets the data from the host 10 through host-side IO device interconnect controller 220, stores them to the memory 280 and then moves them out to the PSD array 400 through the CPC 240. When the write request is a write back request, the IO complete report can be issued to the host first, and then the CPC 240 performs the actual write operation later. Otherwise, when the write request is a write through request, an IO complete report is issued to the host 10 after the requested data is actually written into the PSD array 400.

The memory 280 is connected to the CPC 240 and acts as a buffer therefor to buffer the data transferred between the host 10 and the PSD array 400 passing the CPC 240. In one embodiment, the memory 280 can be a DRAM; more particularly, the DRAM can be a SDRAM.

The device-side IO device interconnect controller 300 is connected to the CPC 240 for connecting the SVC 200A to the PSD array 400. The SAS IO device interconnect controller 300 is an interface and buffers between the SVC 200A and the PSD array 400, and receives IO requests and related data issued from the CPC 240 and maps and/or transfers them to the PSD array 400. The device-side IO device interconnect controller 300 re-formats the data and control signals received from the CPC 240 to comply with the protocol used in the device-side IO device interconnect, and transmits them to the PSD array 400. When a SAS IO device interconnect controller is used as the device-side IO device interconnect controller 300, it re-formats the data and control signals received from CPC 240 to comply with SAS protocol.

A signal integrity enhancing device (SIED) 352 is provided in the SVC 200 between the device-side IO device interconnect controller 300 and the PSD array 400 for improving the signal quality or enhancing signal integrity of electrical signals in transmission such that signal integrity problems which are caused by long distance between the IO device interconnect controller 300 and the disk array 400, or by environmental electrical noise, can be avoided. A PSD array IO board 430 is provided in the PSD array 400 for connecting the PSDs 420 with the SVC 200 through the SIED 352.

Figure 5:
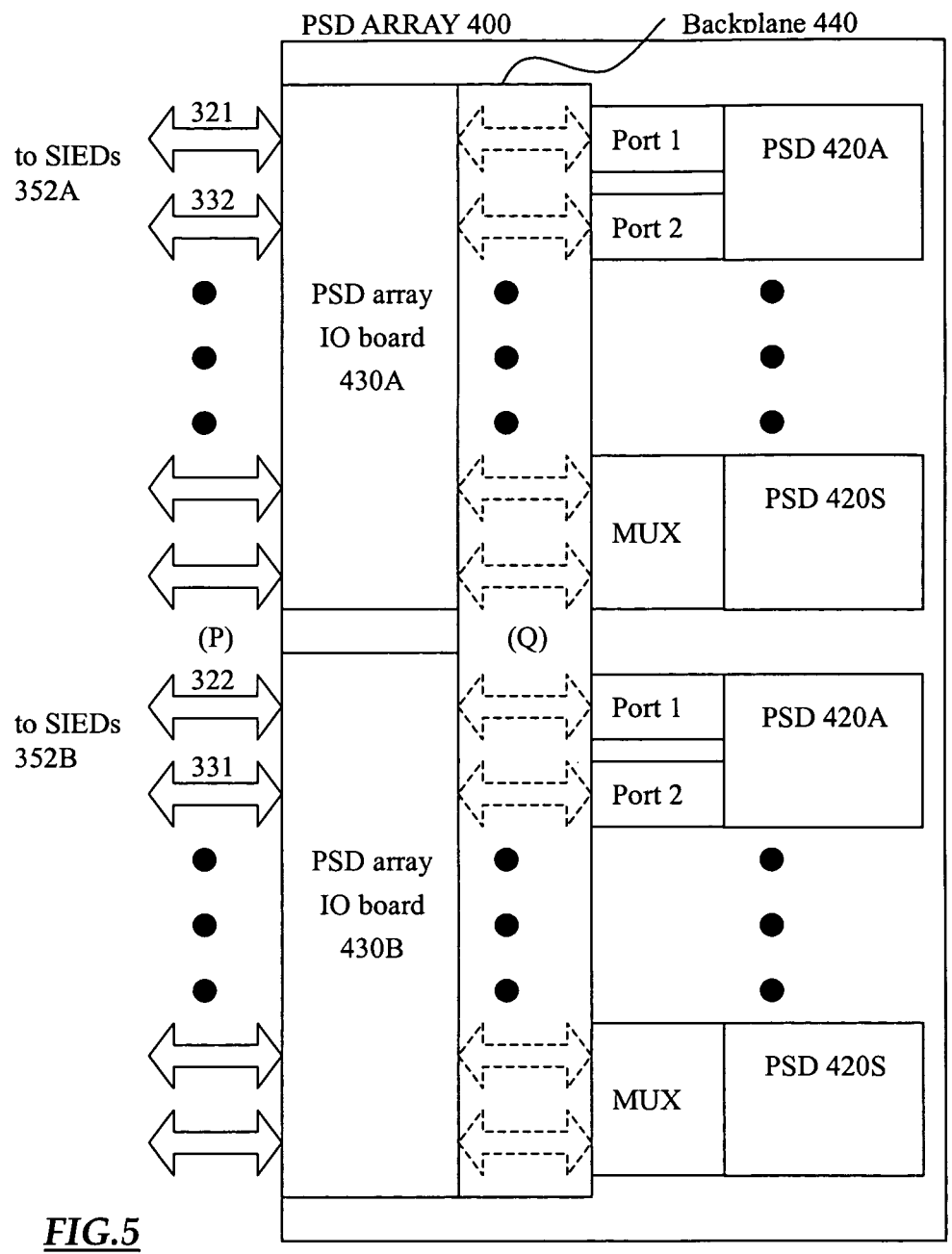
FIG. 5 is a block diagram illustrating in more detail the connecting arrangement between the PSD array IO board 430 and the PSDs in the PSD array 400 in FIG. 2A.

FIG. 5 is a block diagram illustrating, in more detail, the connection between the PSD array IO board 430 and the PSDs 420 in the PSD array 400 in FIG. 2A. A switching circuit (not shown) is implemented in the PSD array IO board 430 for switching between the P interconnects from the SVCs 200 and the Q interconnects to the PSDs 420 through a backplane 440. Please be noted that the number of interconnects from the SVCs 200, P, and the number of interconnects to the PSDs 420, Q, can be different. The switching circuit can be implemented with a SAS expanding circuit 340. The backplane 440 has electrical traces and connectors thereon for connecting between the PSD array IO board 430 and the PSDs 420, and is a robust substitute for cable interconnects. In one embodiment, the switching circuit can be implemented in the SIED 352 rather than in the PSD array IO board 430.

The PSD array IO board 430 can be connected to either a SAS port of a SAS PSD 420A or a SATA port of a SATA PSD 420S. For a SAS PSD 420A, such as a SAS disk drive, since there are two separate ports, port 1 and port 2, on each SAS PSD 420A, two interconnects can be directly connected to a SAS PSD 420A through the two different ports, which forms for a single SAS PSD 420A whose a redundant port pair have redundant interconnects to the SVC(s) 200. For a SATA PSD 420S, such as a SATA disk drive, since there is only one port provided on each SATA PSD 420S, a port selector, such as one implemented with a multiplexer, should be provided to the SATA PSD 420S so as to connect two interconnects thereto to form thereon a redundant pair of interconnects. When the PSD 420 in the PSD array 400 receives the IO requests of the CPC 240 through the SAS IO device interconnect controller 300, it performs some operations in response to the IO requests and transfers the requested data and/or reports and/or information to and/or from the CPC 240. More than one type of PSDs 420 can be provided in the PSD array 400 at the same time. For example, the PSD array 400 may comprise both SAS PSDs and SATA PSDs when the SAS IO device interconnect controller is used.

The RCC interconnect controller 236 is implemented to connect the CPC 240 to another SVC 200 through an interconnect communication channel (ICC channel) for exchanging information, such as data and control signals, between the connected redundant SVCs. In one embodiment, the ICC channel can be implemented through a backplane (not shown) connected between the SVCs 200A and 200B.

In the embodiment shown in FIG. 2A, the IO controller 300 (300A) of the SVC 200A has a first interconnect 321 connected to the signal integrity enhancing device (SIED) 352 (352A) thereof, and has a second interconnect 322 connected to the SIED 352 (352B) of the SVC 200B such that when one of the SIEDs 352A, 352B is blocked, broken, or otherwise malfunctioned, the other SIED 352 that is normal can be used to communicate between the IO controller 300A and the disk array 400. It should be noted that in one embodiment, the second data path 322 is connected to the SIED 352B of the SVC 200B through the backplane (not shown). Of course, when either one of the data paths 321, 322 is inaccessible while the other of the data paths 321, 322 is accessible by the SVC 200A to the PSD array 400, data access by the SVC 200A to the PSD array 400 through the data path pair will be performed through said accessible data path. In such a configuration, we also call data paths 321, 322 a redundant data path pair, which are a first redundant data path pair in the SVS 20.

For the same reason, in the SVC 200B, the IO controller 300B has a first interconnect 331 (third data path) connected to the SIED 352 (352B) thereof, and has a second interconnect 332 (fourth data path) connected to the SIED 352 (352A) of the SVC 200A. The data paths 331, 332 form a second redundant data path pair in the SVS 20. It should be noted that in one embodiment, the fourth data path 332 is connected to the SIED 352A of the SVC 200A through the backplane (not shown).

Therefore, the present redundant has two or more SVCs 200 connected between the host entity 10 and the PSD array 400. Each of the SVCs 200 comprises one or more pair of redundant data paths and a SIED 352. In each of the SVCs 200, each of the redundant data path pair(s) has one of the data paths connected to the PSD array 400 via the SIED 352 in the same SVC 200 and the other of the data paths connected to the PSD array 400 via the SIED 352 in the other SVC 200. When one SVC 200 is malfunctioned such that the data path between itself and the PSD array 400 is inaccessible, the other normal SVC 200 will take over the functionality of the malfunctioned SVC 200 and access to the PSD array 400 through its own data path and SIED 352. When a SIED 352 of a SVC 200 is failed such that the data path between itself and the PSD array 400 is inaccessible, the SVCs 200 will access to the PSD array 400 through the data paths passing the normal SIED 352 of the other SVC 200. In either case above, the malfunctioned or failed SVC 200 can be replaced while the SVS 20 is still on line for the host entity 10 to continuously access the PSD array 400.

In one embodiment, the SIED 352 can be a retimer. In practical implementation, a SAS expander can be used as the retimer 352. In another embodiment, the SIED 352 can be a repeater. In practical implementation, a multiplexer can be implemented as the repeater.

Since there are more than one SVC 200 configured redundantly, while the SATA PSDs are used in the disk array 400, an SATA multiplexing circuit can be provided between the SVCs and the SATA PSD as a port selector when more than one SVC are connected to the SATA PSD 420. When a SAS PSD is used, since there are two separate ports on the SAS PSD, each of the two SVCs 200A and 200B can be separately connected to one of the ports.

Moreover, in an implementation where cables are used as the interconnects between the SVCs 200 and the PSD array 400, the first data path and the fourth data path can be contained in a single cable (not shown) between a first enclosure and a second enclosure, and the second data path and the third data path can be contained in another single cable (not shown) between the first enclosure and the second enclosure such that redundancy of SVCs 200 to the PSD array 400 can be accomplished by providing only one cable between one SVC 200 and the PSD array 400. One situation that cables are used as the interconnects between the SVCs 200 and some PSDs 420 of the PSD array 400 is as follows. The SVS 20 comprises the first enclosure receiving the SVCs 200A and 200B. A first group of PSDs 420 belonging to the PSD array 400 is received in the second enclosure outside of the first enclosure. There might or might not be a second group of PSDs 420 belonging to the PSD array 400 received in the first enclosure. When the first group of PSDs in the second enclosure are intended to connect with the SVCs in a first enclosure, using cables to connect therebetween is a good way. As can be seen in FIG. 5, in view of the connection around the PSD array IO board 430A, for example, the first and fourth data paths 321, 332 or the first and third data paths 321, 331 may form a third redundant pair of interconnects via the switching circuit in the PSD array IO board 430A such that when either path is malfunctioned and inaccessible while the other is normal and accessible, data access by the SVCs to the PSD array through the third redundant data path pair will be performed through the accessible data path therein. For the same reason, in view of the connection around the PSD array IO board 430B, the third and second data paths 331, 322 or the second and fourth data paths 322, 332 may form a fourth redundant pair of interconnects via the switching circuit in the PSD array IO board 430B such that when either path is malfunctioned and inaccessible while the other is normal and accessible, data access by the SVCs to the PSD array through the fourth redundant data path pair will be performed through the accessible data path therein.

The RCC interconnect controller 236 can be integrated with the host-side IO device interconnect controller 220 as a single-chip IC, which comprises a plurality of IO ports including one or more host-side ports and one or more device-side ports. Alternatively, the RCC interconnect controller 236 can be integrated with the device-side IO device interconnect controller 300 as a single-chip IC. Furthermore, the host-side IO device interconnect controller 220, the device-side IO device interconnect controller 300, and the RCC interconnect controller 236 can all be integrated as a single-chip IC. In such an implementation, the single-chip IO device interconnect controller may comprise IO ports for using as host-side port (s), device-side port(s), and IO ports for connecting between/among the SVCs 200.

In the embodiments of FIGS. 2A-2D, the host-side IO device interconnect controller 220 and the device-side IO device interconnect controller 300 (SAS IO device interconnect controller 300) could be implemented with the same kind of IC chip, with IO device interconnect ports in the host-side IO device interconnect controller 220 configured as host-side IO device interconnect ports, and with IO device interconnect ports in the device-side IO device interconnect controller 300 configured as device-side IO device interconnect ports. Alternately, a single chip could be configured to contain both host-side IO device interconnect ports and device-side IO device interconnect ports for, respectively, coupling to the host entity 10 and the PSD array 400 concurrently. Furthermore, a single chip could be configured to contain all the host-side IO device interconnect ports for coupling to the host entity 10, the device-side IO device interconnect ports for coupling to the PSD array 400, and ports for coupling to the other SVC 200, respectively but concurrently.

According to an embodiment of the present invention, when the SAS IO device interconnect controller is used as the device-side IO device interconnect controller 300 in FIG. 2A, the SAS IO device interconnect controller 300 may comprise two PCI-X to SAS controller 310.

Figure 3A:
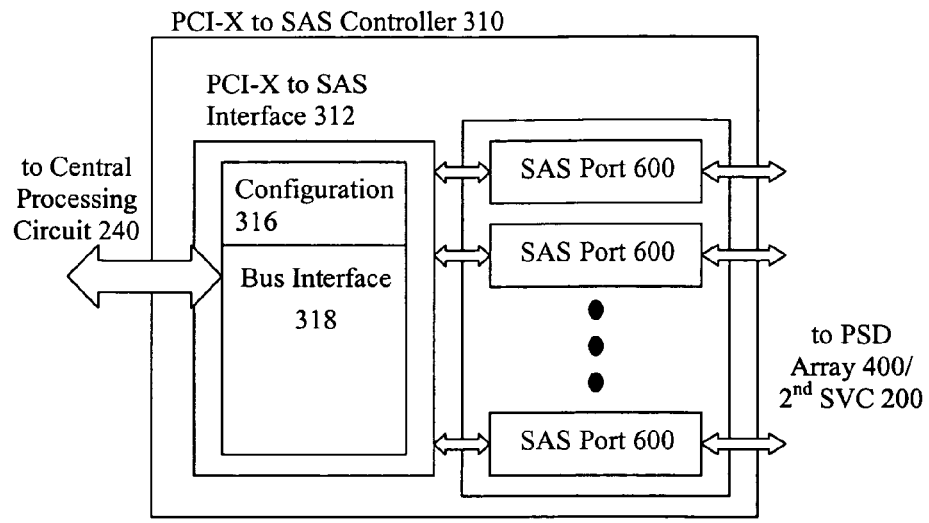
FIG. 3A is a block diagram illustrating an embodiment of the PCI-X to SAS controller 310.

FIG. 3A is a block diagram illustrating an embodiment of the PCI-X to SAS controller 310. As shown in FIG. 3A, each PCI-X to SAS controller 310 contains a PCI-X interface 312 connected to the CPC 240, and contains the SAS ports 600 connected to the PCI-X interface 312. The PCI-X interface 312 comprises a bus interface 318 connected to SAS ports 600 and a configuration circuitry 316 storing the configuration of the PCI-X to SAS controller 310. The SAS port 600 can be connected to the PSD array 400 and/or the other SVC 200.

In an alternative embodiment, a PCI-Express (PCI-E for short) to SATA controller (not shown) can be used in place of the PCI-X to SATA controller 310. In the PCI-E to SATA controller, a PCI-E interface (not shown) is used in place of the PCI-X interface 312. In another alternative embodiment, a PCI to SATA controller can be used in place of the PCI-X to SATA controller 310. In the PCI to SATA controller, a PCI interface is used in place of the PCI-X interface 312. Those skilled in the art will know such replacements can be easily accomplished without any difficulty.

Figure 3B:
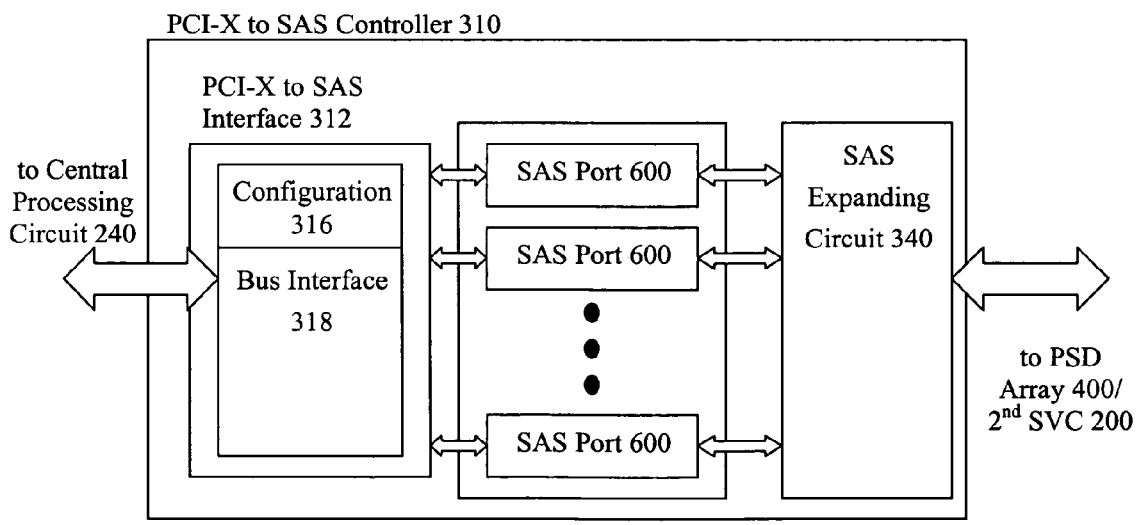
FIG. 3B is a block diagram illustrating a second embodiment of the PCI-X to SAS controller 310.
Figure 3C:
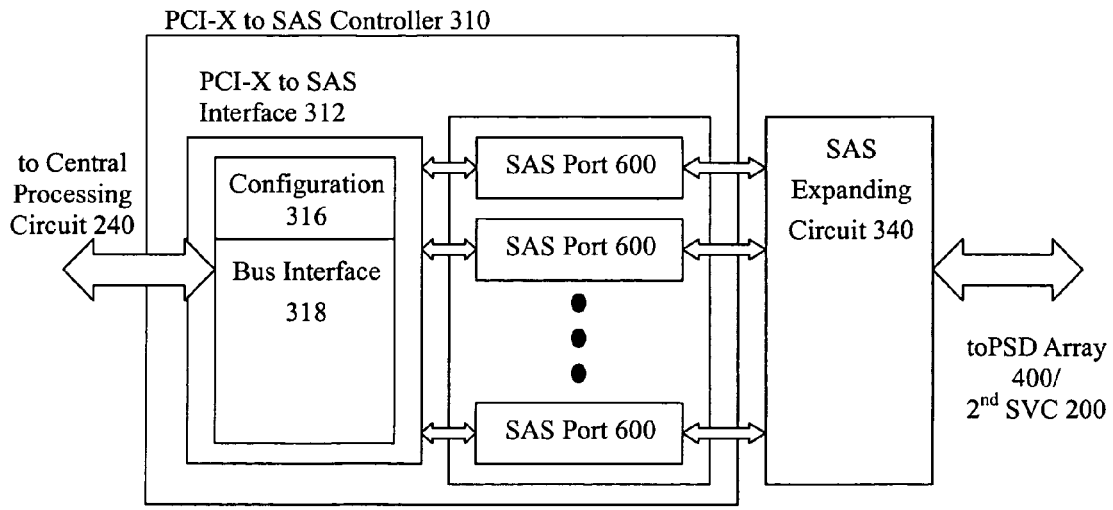
FIG. 3C is a block diagram illustrating a first implementation of connecting arrangement of the PSD array 400 to the PCI-X to SAS controller 310 of FIG. 3A.

FIG. 3B is a block diagram illustrating a second embodiment of the PCI-X to SAS controller 310, which comprises a SAS expanding circuit 340 incorporated therein. A SAS expanding circuit 340 can be implemented as an edge expander device 315, as shown in FIG. 3E, which can be connected to another one or two edge expander device and/or a plurality of end devices, such as SAS ports of one or more PSDs 420. Also, a SAS expanding circuit 340 can be implemented to contain one or more edge expander device sets each comprising a plurality of edge expander devices 315. In addition, a SAS expanding circuit 340 can be implemented as a fanout expander device containing a plurality of edge expander device sets, each of which contains a plurality of edge expander devices 315.

The SAS expander device 315 comprises an expander connection block, a management function block, and a plurality Phys. The expander connection block provides the multiplexing functionality to connect each PHY for signal input and output. The management function block performs the SMP operation of an expander. Through the expander device 315, a plurality of PSDs can be connected to a SAS controller 310, which improves the scalability of the storage volume of the SVS, while through the fanout expander device, a lot of edge expander device sets can be attached thereto, which largely enhances the volume scalability of the SVS. Besides, a plurality of host-side IO device interconnects can be connected to the expanding device 340. These host-side IO device interconnects are connected to either the same or different SVCs.

Figure 3D:
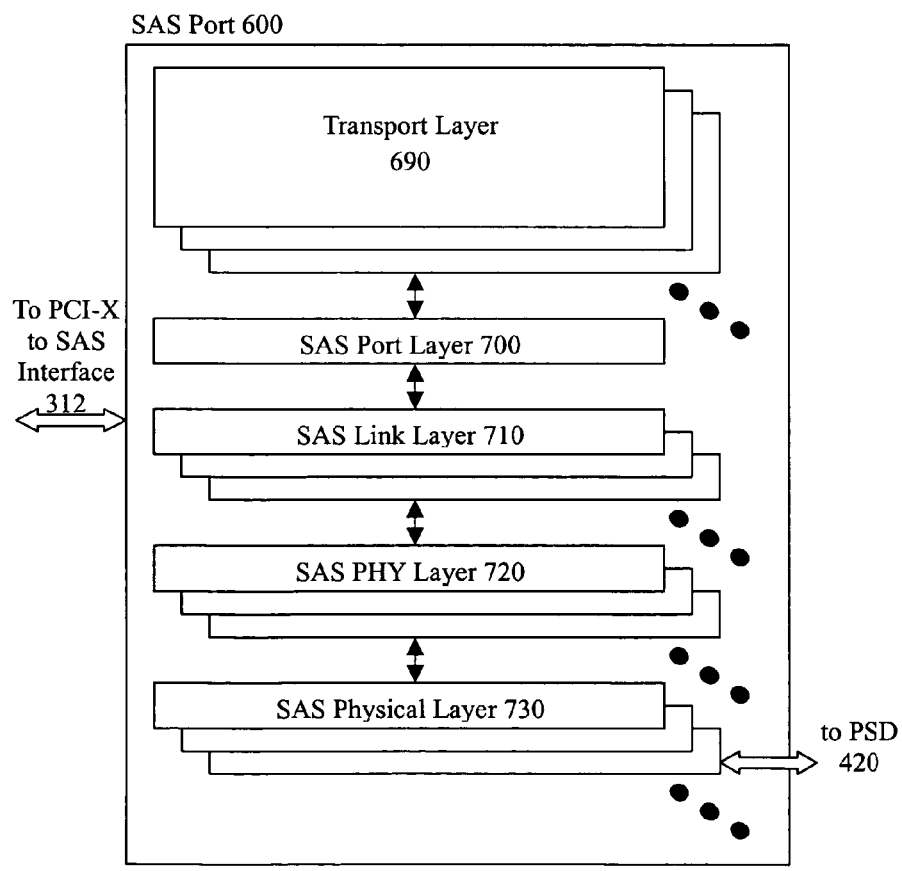
FIG. 3D is a block diagram illustrating an embodiment of the SAS port of FIG. 3A/3B/3C.
Figure 3E:
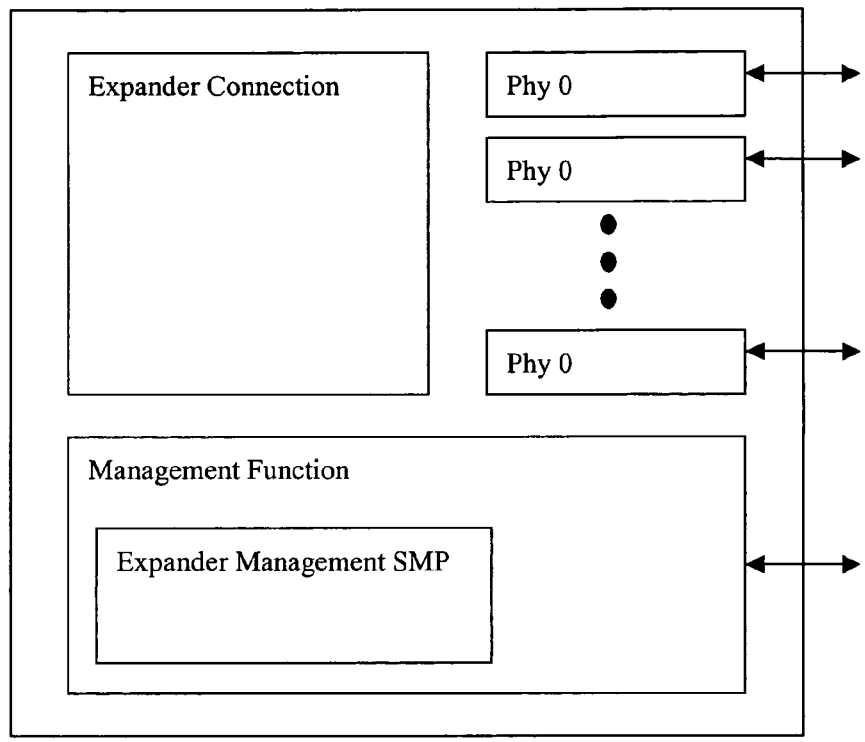
FIG. 3E is a block diagram illustrating an embodiment of the SAS expander device 315 used in the SAS expanding circuit 340 of FIG. 3B/3C.

FIG. 3D is a block diagram illustrating an embodiment of the SAS port 600 of FIG. 3A/3B. As shown in FIG. 3D, the SAS port comprises five parts: the transport layer 690, SAS port layer 700, SAS linker layer 710, SAS PHY layer 720, and SAS physical layer 730. The SAS physical layer 730 includes the SAS connector and cables, and SAS transmitting and receiving circuit. The SAS PHY layer 720 will cover the encoding scheme and the PHY reset sequence including OOB (out off band) signaling and speed negotiation. The SAS link layer 710 will control the SAS PHY layer to manage connections with other SAS devices. The SAS port layer 700 is located between one or more SAS link layer and one or more SAS transport layers, receives and interprets requests and establishes connections by correct SAS link layers. The SAS transport layer 690 comprises SSP transport layer for serial SCSI application, STP transport layer for SATA application and SMP transport layer for management application.

A SAS port 600 contains one or more phys. It could be a "wide" port if there is more than one phy in the port or be a "narrow" port if there is only one phy. The link between SAS IO device interconnect controller 300 and expanding circuit 340 or PSD array 400 could be narrow link or wide link. A wide link can be configured to link between wide ports at both ends to enlarge the transmission bandwidth.

Figure 3F:
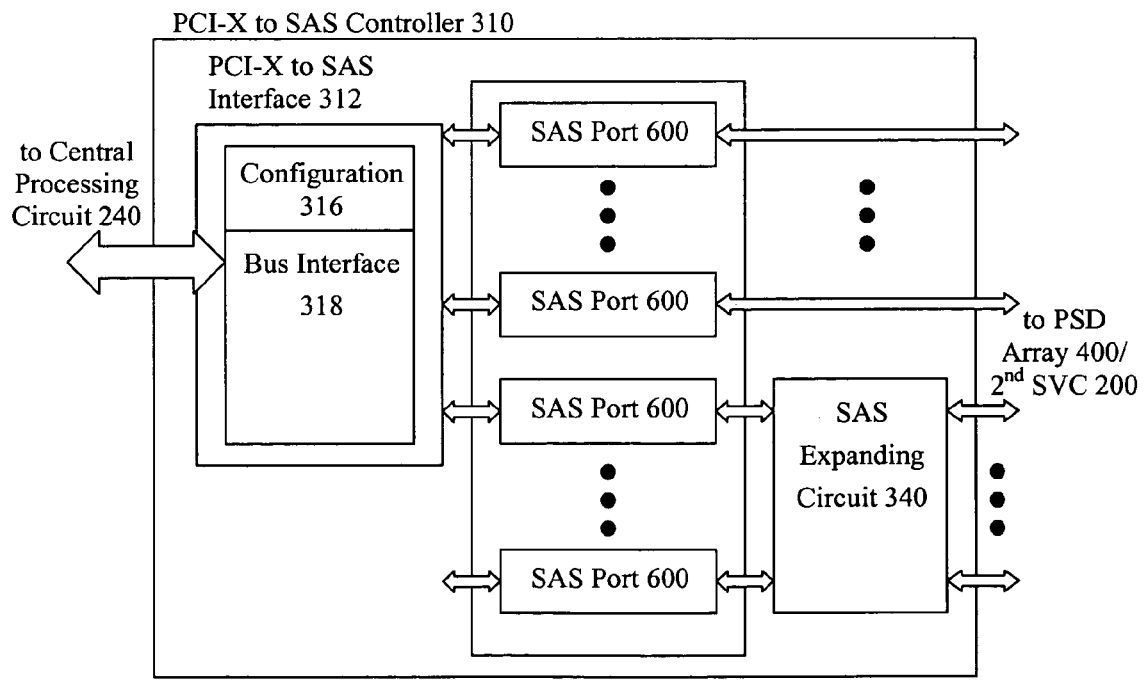
FIG. 3F is a block diagram illustrating a third embodiment of the PCI-X to SAS controller 310.

FIG. 3F is a block diagram illustrating a third embodiment of the PCI-X to SAS controller 310. In this embodiment, some of the SAS ports 600 are connected to the expanding circuit 340 and some of the SAS ports 600 are provided for direct connecting to the PSDs 420, and/or some of the SAS ports 600 are connected to the other SVC 200. In addition, the expanding circuit 340 can be further connected to the PSDs 420 and/or the other SVC 200.

The physical layer 730 will transmit signals, through a pair of differential signal lines, such as transmission lines LTX+, LTX−, to and receive signals, through the other pair of differential signal lines, such as reception lines LRX+, LRX−, from the PSD controller in the PSD 420. The two signal lines of each pair of the signal lines, for example LTX+/LTX−, transmit signals TX+/TX− simultaneously at inverse voltage, for example, +V/−V or −V/+V, with respective to a reference voltage Vref, so that the potential difference will be +2V or −2V and thus to enhance the signal quality thereof. This is also applicable to the transmission of the reception signals RX+/RX− on reception lines LRX+, LRX−.

The phy layer 720 defines 8b/10b coding and OOB signals. All data bytes received from the physical layer 730 will be decoded the 8b/10b characters and be removed the SOF, CRC, EOF. A SAS phy 720 uses the OOB signals to identify and start the operational link connected to another SAS phy 720. After SAS link is operational, the SAS phy layer 720 signals the SAS link layer and the SAS link layer assumes control of the SAS phy layer 720 for communication, including identification sequence, connection management and frame transmission. There are two important types of data structures. SAS primitives and SAS frames used by SAS link layer for data transmission.

A primitive consists of a single double-word and is the simplest unit of information that may be communicated between a host and a device. When the bytes in a primitive are encoded, the resulting pattern is not easy to be misinterpreted as another primitive or a random pattern. Primitives are used primarily to convey real-time state information, to control the transfer of information and to coordinate communication between the host and the device. The first byte of a primitive is a special character.

A frame consists of a plurality of double-words, and starts with a start primitive and ends with an end primitive. The SAS address frame is used when a connection is not established and starts with SOAF (Start of Address Frame) and ends with EOAF (End of Address Frame).

There are three types of connections supported by the SAS, including SSP frame for SAS device, STP frame for SATA device, and SMP frame for management. SSP frame and SMP frame starts with SOF (Start of Frame) and ends with EOF (End of Frame).

A CRC (Cyclic-Redundancy Check Code) is the last non-primitive double word immediately preceding the end primitive. CRC code will be calculated over the contents of the frame, all IO request information communicating between CPC 240 and the PSD 420 through the PCI-X to SAS Controller 310 will perform CRC checking. Hence, inadvertent data damage (e.g., due to noise) during the transfer from SVC to PSD may be detected and recovered, preventing a potential catastrophic data damage situation, in which data gets written to the wrong section of media possibly due to damage of the destination media section base address and/or media section length that are contained in the initial IO request data.

FIG. 3C is a block diagram illustrating a first implementation of connecting arrangement of the PSD array 400 to the PCI-X to SAS controller 310 of FIG. 3A, in which the SAS expanding circuit 340 is not provided in the PCI-X to SAS controller 310 but provided as a separate device which can be attached to the PCI-X to SAS controller 310 as an interface/controller to the PSD ARRAY 400 or another SAS expanding circuit 340.

Figure 3G:
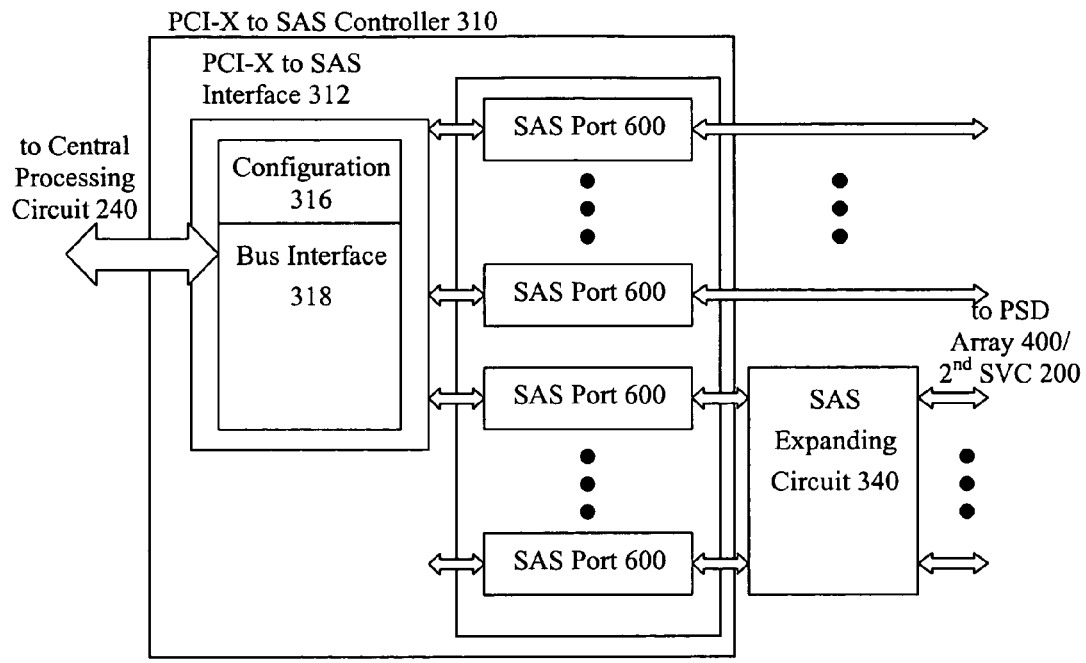
FIG. 3G is a block diagram illustrating a second implementation connecting arrangement of the PSD array 400 to the PCI-X to SAS controller 310 of FIG. 3A.

FIG. 3G is a block diagram illustrating a second implementation of connecting arrangement of the PSD array 400 to the PCI-X to SAS controller 310 of FIG. 3A, in which the SAS expanding circuit 340 is not provided in the PCI-X to SAS controller 310 but provided as a separate device. In this embodiment, some of the SAS ports 600 are connected to the expanding circuit 340 and some of the SAS ports 600 are provided for direct connecting to the PSDs 420, and/or some of the SAS ports 600 are connected to the other SVC 200. In addition, the expanding circuit 340 can be further connected to the PSDs 420 and/or the other SVC 200.

Please note that the SAS expanding circuit 340 in the FIGS. 3C and 3G can function as a retimer. Please also note that some PSDs 420 may be received in an enclosure containing the SVCs 200, while some other PSDs 420 may be received in a separate enclosure containing the PSD array IO boards 430 and the backplane 440. In one embodiment, the former PSDs 420 may be connected to the SAS ports 600 without passing through the SIED 352 since the signal quality could be fine due to shorter transmission distance.

Although the embodiments of the SAS Controller 300 mentioned above include two PCI-X to SAS controller 310, the SAS Controller 300 according to the present invention may also include one or more than two controller 310 in other embodiments thereof, depending on performance considerations, engineering considerations, and/or cost or market considerations. Those skilled in the art will know that such adjustments and considerations can be easily accomplished without any difficulty.

Figure 4:
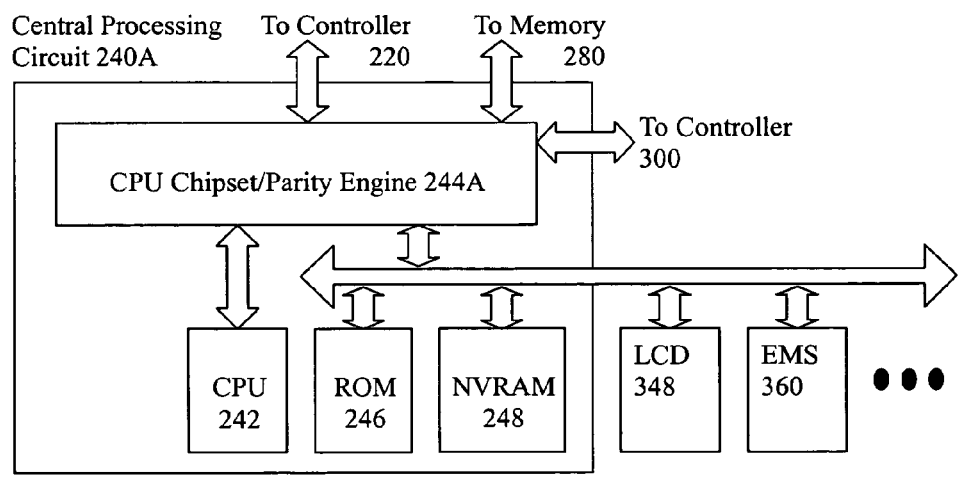
FIG. 4 shows a block diagram exemplifying the CPC according to the present invention and the connection thereof to other functional blocks of the SVC.

FIG. 4 shows a block diagram exemplifying the CPC according to the present invention and the connection thereof to other functional blocks of the SVC.

In FIG. 4, the first embodiment of the CPC block is shown as the CPC 240A, comprising the CPU chipset/parity engine 244A, the CPU 242, a ROM (Read Only Memory) 246, a NVRAM (Non-volatile RAM) 248, a liquid crystal display (LCD) 348 and an enclosure management service circuitry EMS 360. The CPU can be, e.g., a Power PC CPU. The ROM 246 can be a FLASH memory for storing BIOS and/or other programs. The NVRAM is provided for saving some information regarding the IO operation execution status of the PSDs (e.g., disks) which can be examined after an abnormal power shut-off occurs and meanwhile the IO operation execution does not complete. LCD module 348 shows the operation of the subsystem LCDs. EMS 360 can control the power of the DASA array and do some other management. The ROM 246, the NVRAM 248, the LCD 348 and the enclosure management service circuitry EMS 360 are connected to the CPU chipset/parity engine 244A through an X-bus. The CPU chipset/parity engine 244A is a CPU chipset implemented therein a parity engine. The parity engine implemented in the CPU chipset can perform parity functionality of a certain RAID level in response to the instruction of the CPU 242. Of course, the parity engine can be shut off and perform no parity functionality at all in some situation, for example, in a RAID level 0 case. Alternatively, the CPU chipset 244 and parity engine can be implemented as two separate chips.

In a further embodiment, the parity engine is omitted. The CPC 240 can do without a parity engine if such a functionality is not required by the SVC 200 or SVS 20. For example, for a JBOD emulator controller without parity function or a subsystem thereof, or, a RAID level 1 controller or a subsystem thereof, no parity functionality is required, and thus parity functionality can be omitted. In another scenario, where the parity function is performed by the CPU which executes some parity function programs or codes rather than by a dedicated hardware like a parity engine, parity engine can be omitted. This could be a low performance but low cost solution for the parity functionality.

In still a further embodiment of the CPC 240, a data protection engine which can perform a data protection function more than and/or other than a parity function can be provided. For example, the data protection engine may have an ECC (error correcting code) function.

In still a further embodiment of the CPC 240, the ROM 246 is embedded made in the CPU chipset/ROM chip. Or, the ROM is integrally provided in the CPU chipset/ROM chip.

In still a further embodiment of the CPC 240, CPU is embedded made in the embedded CPU/CPU chipset chip.

FIG. 4 and the above only show that a few variations exemplifying the CPC 240, other variations and/or modifications which can be easily made by those skilled in the art, should be considered as a portion of the present invention. For example, according to the trend of SOC (System On Chip), all the functional blocks in the CPC 240 can be formed integrally in one chip or embedded in a single die.

The above-mentioned SVC can be a RAID SVC which is configured to perform RAID functionality and used in a RAID SVS. Alternatively, the above-mentioned SVC can be a JBOD SVC which is configured to perform JBOD functionality and is used in a JBOD SVS.

Alternatively, in a JBOD SVS, the JBOD SVC can be an expanding circuit including a micro-processor rather than a CPU.

Figure 2B:
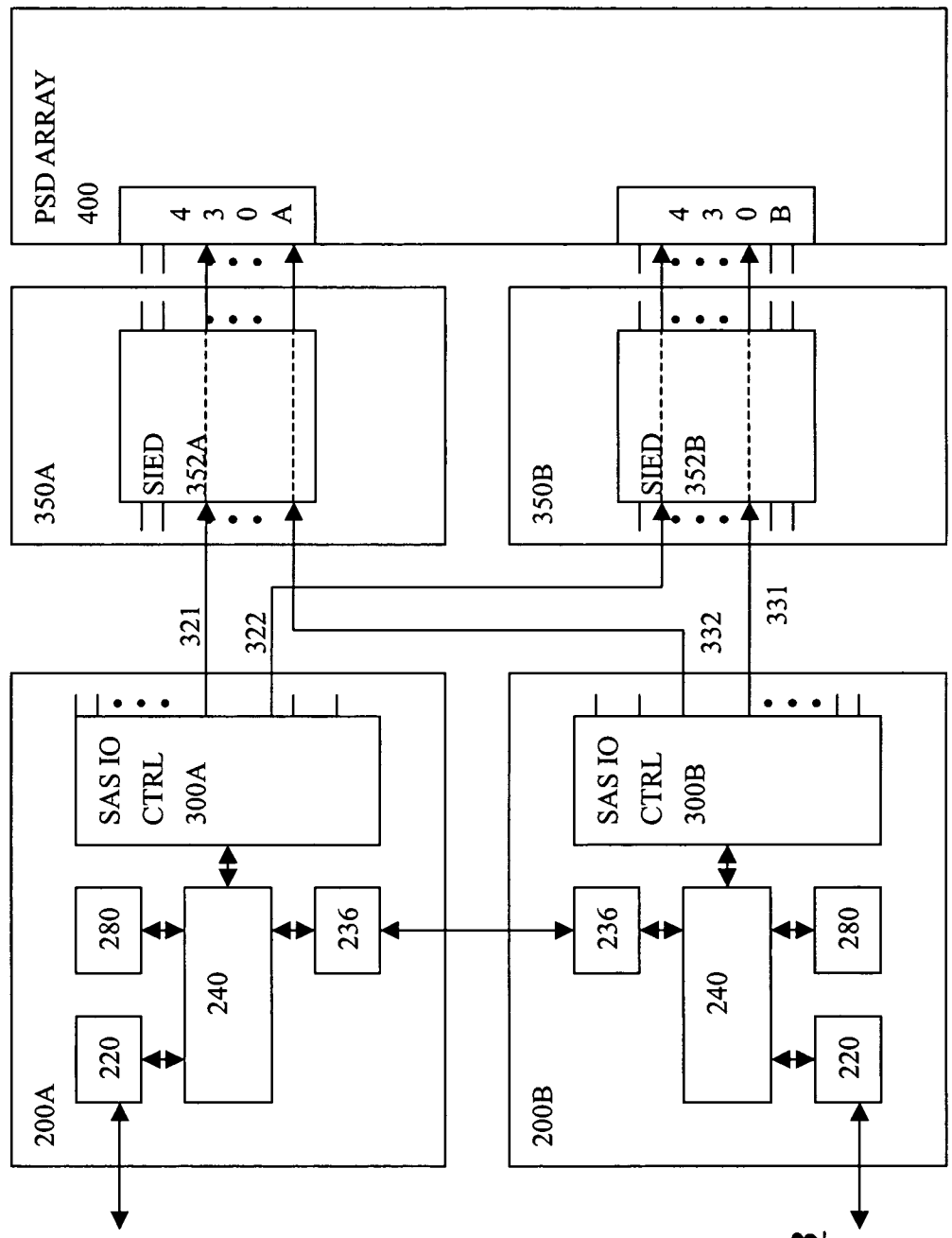
FIG. 2B is a block diagram showing a second embodiment of an SVC 200 according to the present invention.
Figure 2C:
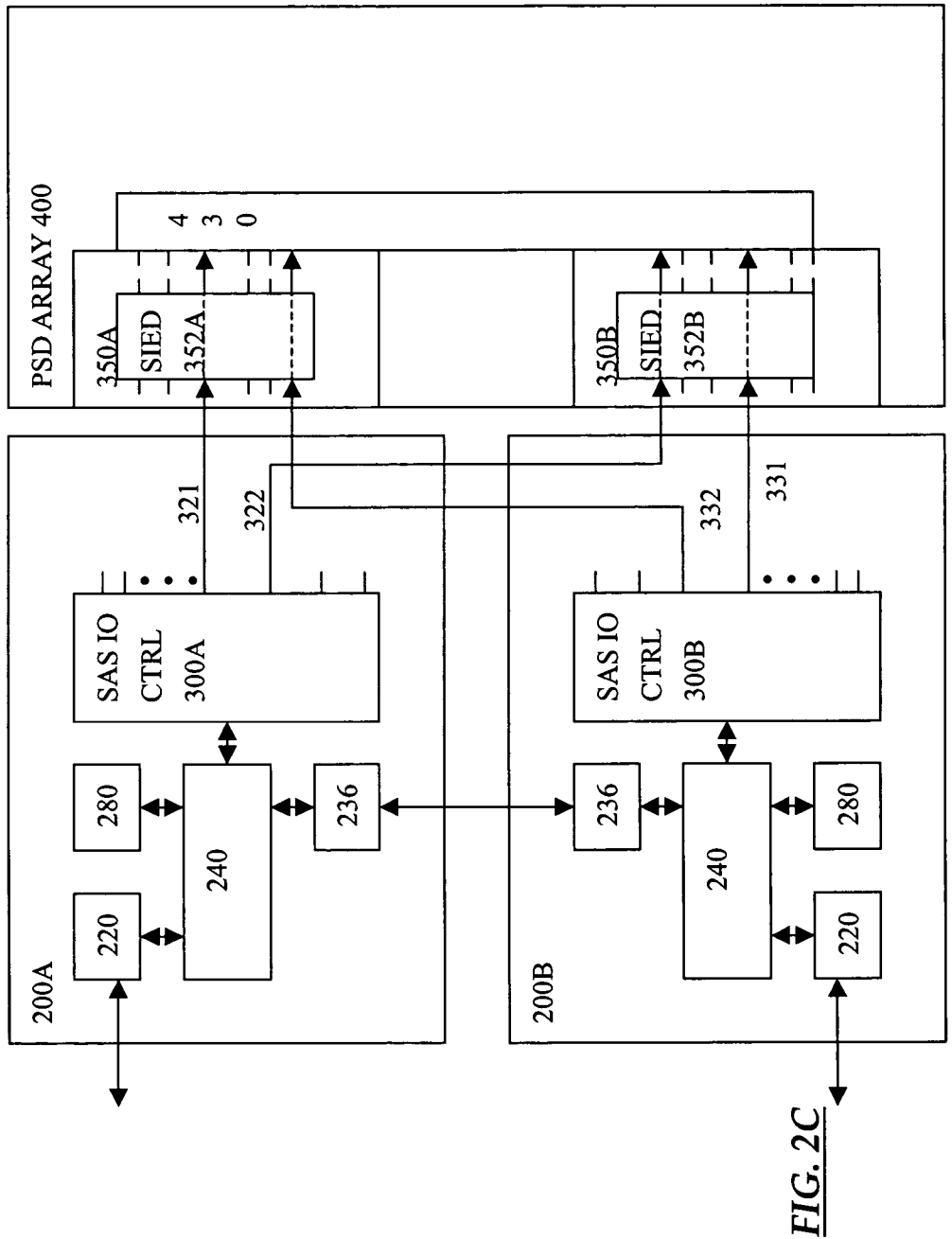
FIG. 2C is a block diagram showing a third embodiment of an SVC 200 according to the present invention.

Please refer to FIG. 2B, in which a second embodiment of the SVS 20 according to the present invention is shown. In this embodiment, the SIED 352 is provided on a separate circuit board 350 rather than being incorporated with the SVC 200. The SIED 352A is provided on the circuit board 350A and the SIED 352B is provided on the circuit board 350B. With such an implementation, when one of the SIEDs 352A and 352B malfunctions, only the circuit board 350 including the malfunctioned SIED 352 needs to be replaced while the SVCs 200 does not need to be replaced. Therefore, in performing the replacement, both the SVCs 200 are still on line and functioning normally without losing the redundancy provided by the plurality of SVCs 200. That is, the first and second circuit boards are hot-swappable. We also call the circuit boards 350 branching circuit boards or branching boards.

Moreover, in an implementation where cables are used as the interconnects between the circuit board 350 and the PSD array 400, the first data path and the fourth data path can be contained in a single cable (not shown) between a first enclosure and a second enclosure, and the second data path and the third data path can be contained in another single cable (not shown) between the first enclosure and the second enclosure such that redundancy of SVCs 200 to the PSD array 400 can be accomplished by providing only one cable between one circuit board 350 and the PSD array 400. One situation that cables are used as the interconnects between the SVCs 200 and some PSDs 420 of the PSD array 400 is as follows. The SVS 20 comprises the first enclosure receiving the SVCs 200A and 200B and the circuit boards 350A and 350B. A first group of PSDs 420 belonging to the PSD array 400 are received in the second enclosure outside of the first enclosure. There might or might not be a second group of PSDs 420 belonging to the PSD array 400 received in the first enclosure. When the first group of PSDs in a second enclosure are intended to connect with the SVCs in a first enclosure, using cables to connect therebetween is a good way Please refer to FIG. 2C, in which a third embodiment of the SVS 20 according to the present invention is shown. In this embodiment, the SIED 352 is provided in the PSD array 400 on a circuit board 350 rather than being incorporated with the SVC 200. The SIED 352A is provided on the circuit board 350A, and the SIED 352B is provided on the circuit board 350B. With such an implementation, when one of the SIEDs 352A and 352B malfunctions, only the circuit board 350 including the malfunctioned SIED 352 needs to be replaced while the SVCs 200 does not need to be replaced. Therefore, when performing the replacement, both the SVCs 200 are still on line and function normally without losing the redundancy provided by the plurality of SVCs 200. That is, the first and second circuit boards are hot-swappable. In addition, only one PSD array IO board 430 is provided for both circuit boards 350A, 350B, which lowers the manufacturing cost. In such an implementation, the PSD array IO board 430 and the backplane 440 may be combined into one circuit board. The switching circuit may be implemented either in both the circuit boards 350A, 350B or in the PSD array IO board 430. Of course, providing two PSD array IO boards 430 each for one of the circuit boards 350A, 350B is also workable, which provides redundancy to the connectivity of the PSD array IO boards 430.

Figure 2D:
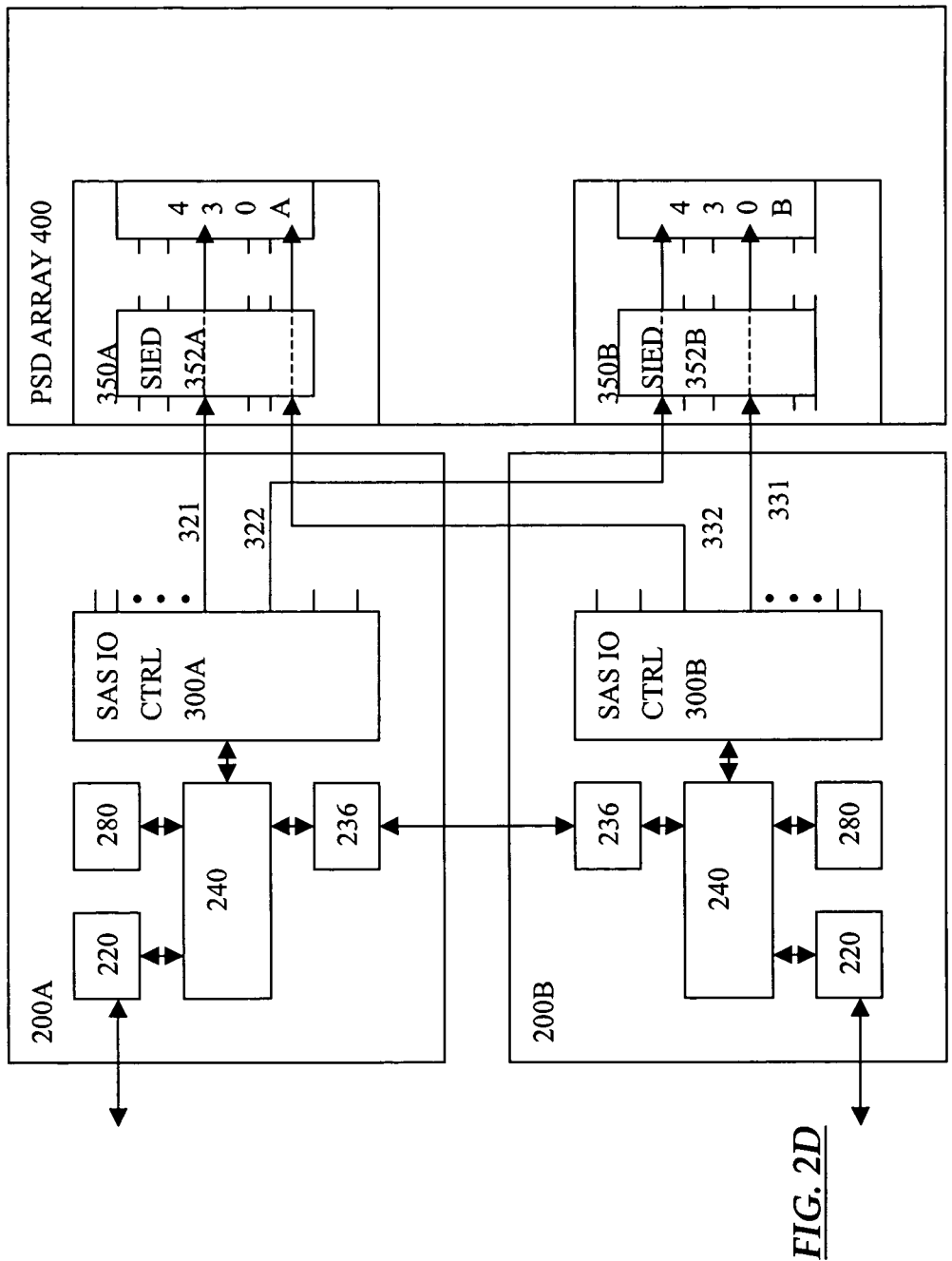
FIG. 2D is a block diagram showing a fourth embodiment of an SVC 200 according to the present invention.

Please refer to FIG. 2D, in which a fourth embodiment of the SVS 20 according to the present invention is shown. In this embodiment, the SIED 352 is provided in the PSD array 400 on a circuit board 350 rather than incorporated with the SVC 200. The SIED 352A is provided on the circuit board 350A together with the PSD array IO board 430. Moreover, since the PSD array IO board 430 is incorporated with the circuit board 350, the function of the SIED 352A and the PSD array IO board 430A may be implemented with only one IC chip. For example, when the SIED 352A is a retimer implemented with a SAS expander, and the switching circuit of the PSD array IO board 430 is also incorporated with a SAS expander, a single SAS expander can achieve both the retimer function and the switching circuit function.

With such an implementation, when one of the SIEDs 352A and 352B malfunctions, only the circuit board 350 including the malfunctioned SIED 352 needs to be replaced while the SVCs 200 does not need to be replaced. Therefore, when performing the replacement, both the SVCs 200 are still on line and function normally without losing the redundancy provided by the plurality of SVCs 200. That is, the first and second circuit boards are hot-swappable. In addition, the incorporation of the PSD array IO board 430 and circuit boards 350 into one circuit board can lower the manufacturing cost.

Moreover, for the third and fourth embodiments, in an implementation where cables are used as the interconnects between the SVCs 200 and the PSD array 400, the first data path and the fourth data path can be contained in a single cable (not shown) between a first enclosure and a second enclosure, and the second data path and the third data path can be contained in another single cable (not shown) between the first enclosure and the second enclosure such that redundancy of SVCs 200 to the PSD array 400 can be accomplished by providing only one cable between one SVC 200 and the PSD array 400. One situation in which cables are used as the interconnects between the SVCs 200 and some PSDs 420 of the PSD array 400 is as follows. The SVS 20 comprises the first enclosure receiving the SVCs 200A and 200B. A first group of PSDs 420 belonging to the PSD array 400 is received in the second enclosure outside of the first enclosure. There might or might not be a second group of PSDs 420 belonging to the PSD array 400 received in the first enclosure. When the first group of PSDs in a second enclosure are intended to connect with the SVCs in a first enclosure, using cables to connect therebetween is a good way.

Figure 2E:
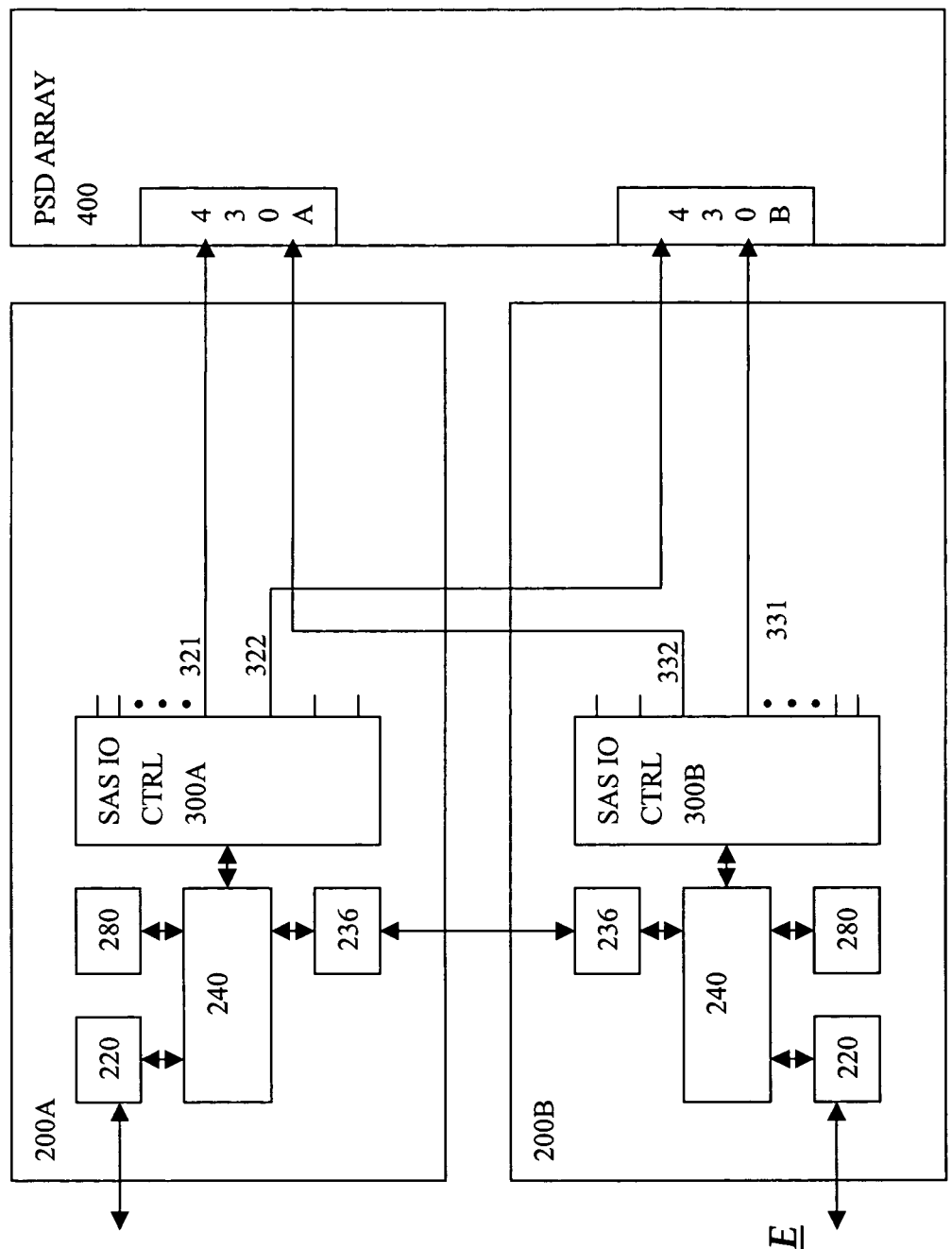
FIG. 2E is a block diagram showing a fifth embodiment of an SVC 200 according to the present invention.

Please refer to FIG. 2E, in which a fifth embodiment of the SVS 20 according to the present invention is shown. This embodiment is similar to the first embodiment shown in FIG. 2A, but the SIEDs 352 shown in FIG. 2A is omitted. As explained earlier, the purpose of providing a SIED 352 is to improve the signal quality. When the signal quality is good enough, the SIED 352 can be omitted. When it is not required to improve the signal quality, the present embodiment performs the same function as that of the first embodiment.

Figure 2F:
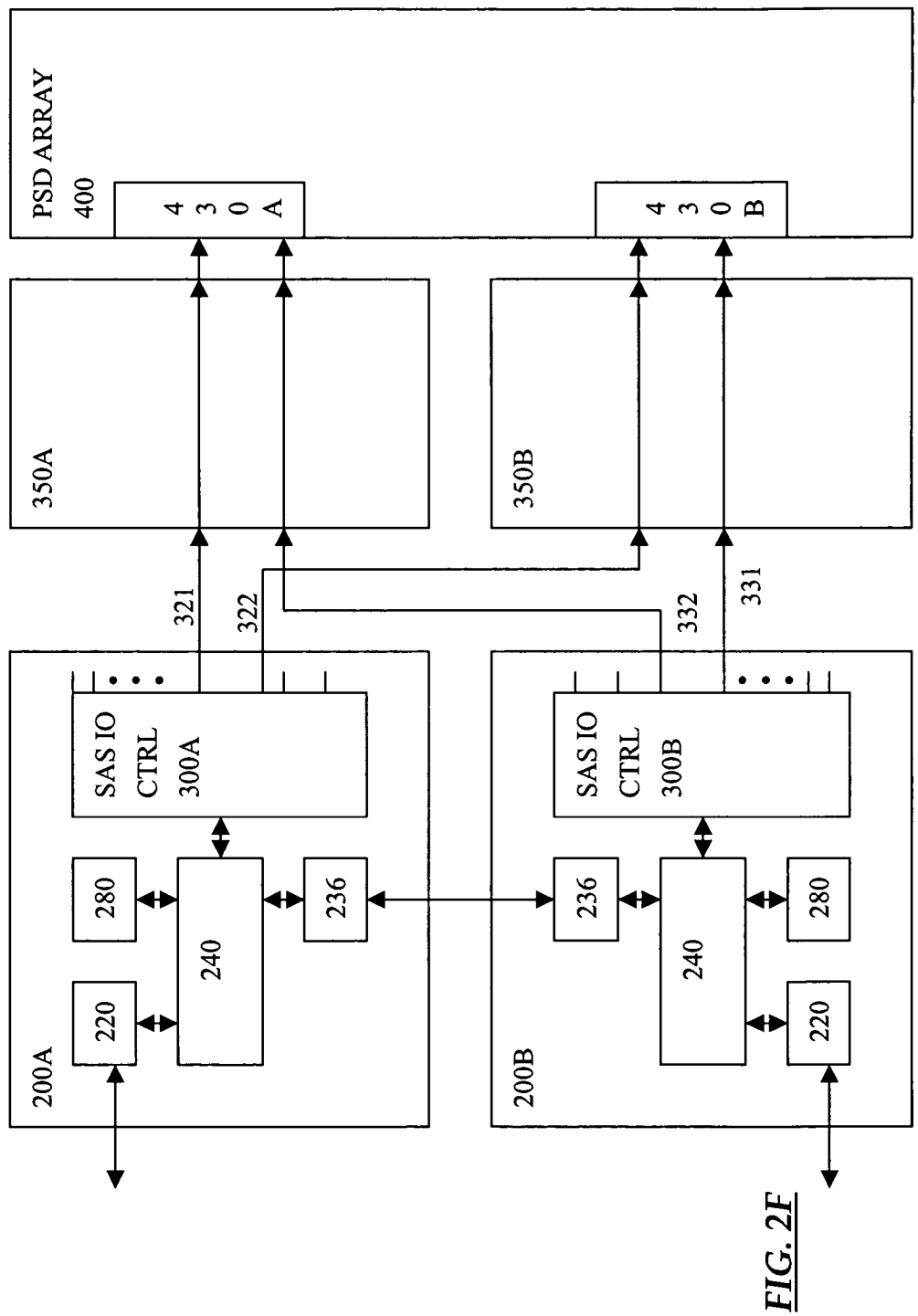
FIG. 2F is a block diagram showing a sixth embodiment of an SVC 200 according to the present invention.

Please refer to FIG. 2F, in which a sixth embodiment of the SVS 20 according to the present invention is shown. This embodiment is similar to the second embodiment shown in FIG. 2B, but the SIEDs 352 shown in FIG. 2B is omitted. When the signal quality is good enough, the SIED 352 can be omitted. With such an implementation, when one of the circuit boards 350, or branching boards, malfunctions, only the malfunctioned circuit board 350 needs to be replaced while SVCs 200 does not need to be replaced. Therefore, in performing the replacement, both the SVCs 200 are still on line and function normally without losing the redundancy provided by the plurality of SVCs 200. That is, the first and second circuit boards are hot-swappable. We also call the circuit boards 350 branching circuit boards or branching boards.

Those skilled in the art will readily observe that numerous modifications and alternations of the device may be made while retaining the teaching of the invention. Accordingly, the above disclosure should be construed as limited only by the metes and bounds of the relevant claims.

What is claimed is:

1. A redundant storage virtualization subsystem (SVS) comprising:
 a first and a second storage virtualization controller (SVC) redundantly configured into a redundant SVC pair;
 a physical storage device (PSD) array; and
 a first and a second data path provided between said first SVC and said PSD array, and configured as a first pair of redundant data paths; and
 a third and a fourth data path provided between said second SVC and said PSD array, and configured as a second pair of redundant data paths;
 wherein when one of said first, second, third and fourth data paths is inaccessible, while one or more of the rest of said three data paths are accessible by said SVCs to said PSD array, data access by said SVCs to said PSD array is performed through a said accessible data path; and
 wherein said SVCs are provided in a first enclosure, said PSD array is provided in a second enclosure, and said first data path and said fourth data path between said first enclosure and said second enclosure are configured as a third pair of redundant data paths and are contained in a single cable, part of said cable contained in a connector, where said third pair of redundant data paths including said first data path and said fourth data path are independent from each other in said single cable, such that data path redundancy between said SVCs and said PSD array can be achieved by said single cable containing said redundant first data path and fourth data path.

2. The SVS of claim 1, wherein when, in one of said pairs of redundant data paths, one of said data paths is inaccessible while the other of said data paths is accessible by said SVCs to said PSD array, data access by said SVCs to said PSD array through said pair of redundant data paths can be performed through said accessible data path.

3. The SVS of claim 2, wherein at least one branching board is provided, and at least one of said first and fourth data paths passes through a said at least one branching board, and at least one of said second and third data paths passes through a said at least one branching board.

4. The SVS of claim 2, wherein at least one of the first and fourth data paths passes through a first signal integrity enhancing device (SIED), and at least one of said second and third data paths passes through a second SIED.

5. The SVS of claim 2, wherein one of said first and second data path is connected to said second SVC through a backplane, and one of said third and fourth data path is connected to said first SVC through the backplane.

6. The SVS of claim 2, wherein a plurality of SIEDs are provided, and said first and second data paths pass through different said SIEDs, and said third and fourth data paths pass through different said SIEDs.

7. The SVS of claim 4, wherein said first and said second SIED each is provided on a first and a second circuit board, respectively, both of which are separate from said first and second SVCs.

8. The SVS of claim 7, wherein said first and second circuit boards are hot-swappable.

9. The SVS of claim 4, wherein said first SIED is provided on a same circuit board as said first SVC, and said second SIED is provided on a same circuit board as said second SVC.

10. The SVS of claim 4, wherein a said SIED is a SAS expander.

11. The SVS of claim 2, wherein said PSD array comprises a SAS PSD.

12. The SVS of claim 2, wherein said PSD array comprises a SATA PSD.

13. The SVS of claim 2, wherein said data paths comply with SAS protocol.

14. The SVS of claim 2, wherein said SVCs comprise SAS device-side IO device interconnect controllers connected with said data paths.

15. The SVS of claim 2, wherein, in one of said pairs of redundant data path, data access between said SVCs and said PSD array is performed via only one of said data paths at a time.

16. The SVS of claim 2, wherein an inter-controller communication channel is provided between said SVCs for communication of information.

17. The SVS of claim 2, wherein said first and fourth data paths are connected with a first PSD of said PSD array and are configured as said third pair of redundant data paths; when, in said third pair of redundant data paths, one of said data paths is inaccessible while the other of said data paths is accessible by said SVCs to said first PSD, data access by said SVCs to said first PSD through said third pair of redundant data paths can be performed through said accessible data path.

18. The SVS of claim 2, wherein said data paths are connected to PSDs in said PSD array through at least one PSD array IO board.

19. The SVS of claim 18, wherein said at least one PSD array IO board comprises a fast and a second PSD array IO board for connecting to said first and second SIEDs, respectively.

20. The SVS of claim 2, wherein in the redundant storage virtualization controller pair, each of the storage virtualization controllers further comprises:
a central processing circuitry for performing IO operations in response to IO requests of said host entity; at least one IO device interconnect controller coupled to said central processing circuitry; at least one host-side IO device interconnect port provided in a said at least one IO device interconnect controller for coupling to said host entity; and at least one device-side IO device interconnect port provided in a said at least one IO device interconnect controller coupled to said PSD array through a point-to-point serial-signal interconnect.

21. The SVS of claim 20, wherein a said host-side IO device interconnect port and a said device-side I/O device interconnect port are provided in the same IO device interconnect controller.

22. The SVS of claim 20, wherein a said host-side IO device interconnect port and a said device-side IO device interconnect port are provided in different said IO device interconnect controllers.

23. A computer system comprising a host entity and a redundant storage virtualization subsystem (SVS), said SVS comprising:
a first and a second storage virtualization controller (SVC) redundantly configured into a redundant SVC pair;
a physical storage device (PSD) array; and
a first and a second data path provided between said first SVC and said PSD array and configured as a first pair of redundant data paths; and
a third and a fourth data path provided between said second SVC and said PSD array and configured as a second pair of redundant data paths;
wherein said SVCs are provided in a first enclosure, said PSD array is provided in a second enclosure, and said first data path and said fourth data path between said first enclosure and said second enclosure are configured as a third pair of redundant data paths and are contained in a single cable, part of said cable contained in a connector, where said third pair of redundant data paths including said first data path and said fourth data path are independent from each other in said single cable such that data path redundancy between said SVCs and said PSD array can be achieved by said single cable containing said redundant first data path and fourth data path; and
wherein when one of said first, second, third and fourth data paths is inaccessible, while one or more of the rest of the three data paths are accessible by said SVCs to said PSD array, data access by said SVCs to said PSD array is performed through said accessible data path.

24. The computer system of claim 23, wherein when, in one of said pairs of redundant data paths, one of said data paths is inaccessible while the other of said data paths is accessible by said SVCs to said PSD array, data access by said SVCs to said PSD array through said pair of redundant data paths can be performed through said accessible data path.

25. The computer system of claim 24, wherein at least one branching board is provided, and at least one of said first and fourth paths passes through a said at least one branching board, and at least one of said second and third paths passes through a said at least one branching board.

26. The computer system of claim 24, wherein at least one of the first and fourth data paths passes through a first signal integrity enhancing device (SIED), and at least one of said second and third data paths passes through a second SLED.

27. The computer system of claim 24, wherein one of said first and second data path is connected to said second SVC through a backplane, and one of said third and fourth data path is connected to said first SVC through said backplane.

28. The computer system of claim 24, wherein a plurality of SIEDs are provided, and said first and second data paths pass through different said SIEDs, and said third and fourth data paths pass through different said SIEDs.

29. The computer system of claim 26, wherein said first and said second SIED each is provided on a first and a second circuit board, respectively, both of which are separate from said first and second SVCs.

30. The computer system of claim 29, wherein said first and second circuit boards are hot-swappable.

31. The computer system of claim 26, wherein said first SIED is provided oft a same circuit board as said first SVC and said second SIED is provided on a same circuit board as said second SVC.

32. The computer system of claim 26, wherein a said SIED is a SAS expander.

33. The computer system of claim 24, wherein said PSD array comprises a SAS PSD.

34. The computer system of claim 24, wherein said PSD array comprises a SATA PSD.

35. The computer system of claim 24, wherein said data paths comply with SAS protocol.

36. The computer system of claim 24, wherein said SVCs comprise SAS device-side IO device interconnect controllers connected with said data paths.

37. The computer system of claim 24, wherein, in one of said pairs of redundant data paths, data access between said SVCs and said PSD array is performed via only one of said data paths at a time.

38. The computer system of claim 24, wherein said first and fourth data paths are connected with a first PSD of said PSD array and are configured as said third pair of redundant data paths; when, in one of said third pair of redundant data paths, one of said data paths is inaccessible while the other of said data paths is accessible by said SVCs to said first PSD, data access by said SVCs to said first PSD through said third pair of redundant data paths can be performed through said accessible data path.

39. The computer system of claim 24, wherein an inter-controller communication channel is provided between said SVCs for communication of information.

40. The computer system of claim 24, wherein in the redundant storage virtualization controller pair, each of the storage virtualization controllers further comprises: a central processing circuitry for performing IO operations in response to IO requests of said host entity; at least one IO device interconnect controller coupled to said central processing circuitry; at least one host-side IO device interconnect port provided in a said at least one IO device interconnect controller for coupling to said host entity; and
    at least one device-side IO device interconnect port provided in a said at least one IO device interconnect controller coupled to said PSD array through a point-to-point serial-signal interconnect.

41. The computer system of claim 40, wherein a said host-side IO device interconnect port and a said device-side I/O device interconnect port are provided in the same IO device interconnect controller.

42. The computer system of claim 40, wherein a said host-side IO device interconnect port and a said device-side IO device interconnect port are provided in different said IO device interconnect controllers.

43. A data access performing method for using in a redundant storage virtualization subsystem (SVS), said SVS comprising a first and a second storage virtualization controller (SVC) redundantly configured into a redundant SVC pair and a physical storage device (PSD) array; said method comprising the steps of:
    providing a first and a second data path configured as a first pair of redundant data paths between said first SVC and said PSD array;
    providing a third and a fourth data path configured as a second pair of redundant data paths between said second SVC and said PSD array; and
    providing said SVCs in a first enclosure; and
    providing said PSD array in a second enclosure, in which said first data path and said fourth data path between said first enclosure and said second enclosure are configured as a third pair of redundant data paths and are contained in a single cable, part of said cable contained in a connector, where said third pair of redundant data paths including said first data path and said fourth data path are independent from each other in said single cable such that data path redundancy between said SVCs and said PSD array can be achieved by said single cable containing said redundant first data path and fourth data path, and when one of said first, second, third and fourth data paths is inaccessible, while one or more of the rest of the three data paths are accessible by said SVCs to said PSD array, data access by said SVCs to said PSD array is performed through said accessible data path.

44. The method of claim 43, wherein when, in one of said pairs of redundant data paths, one of said data paths is inaccessible while the other of said data paths is accessible by said SVCs to said PSD array, data access by said SVCs to said PSD array through said pair of redundant data path pairs can be performed through said accessible data path.

45. The method of claim 44, wherein at least one branching board is provided, and at least one of first and fourth data paths passes through a said at least one branching board, and at least one of said second and third data paths passes through a said at least one branching board.

46. The method of claim 44, wherein at least one of the first and fourth data paths passes through a first signal integrity enhancing device (SIED), mad at least one of said second and third paths passes through a second SIED.

47. The method of claim 44, wherein one of said first and second data path is connected to said second SVC through a backplane, and one of said third and fourth data path is connected to said first SVC through the backplane.

48. The method of claim 44, wherein a plurality of SIEDs are provided, and said first and second data paths pass through different said SIEDs, and said third and fourth data paths pass through different said SIEDs.

49. The method of claim 46, wherein said first and said second SIED each is provided on a first and a second circuit board, respectively, both of which are separate from said first and second SVCs.

50. The method of claim 49, wherein said first and second circuit boards are hot-swappable.

51. The method of claim 46, wherein said first SIED is provided on a same circuit board as said first SVC, and said second SIED is provided on a same circuit board as said second SVC.

52. The method of claim 46, wherein a said SIED is a SAS expander.

53. The method of claim 44, wherein said PSD array comprises a SAS PSD.

54. The method of claim 44, wherein said PSD array comprises a SATA PSD.

55. The method of claim 44, wherein said data paths comply with SAS protocol.

56. The method of claim 44, wherein said SVCs comprise SAS device-side TO device interconnect controllers connected with said data paths.

57. The method of claim 44, wherein, in one of said pairs of redundant data paths, data access between said SVCs and said PSD array is performed via only one of said data paths at a time.

58. The method of claim 44, wherein an inter-controller communication channel is provided between said SVCs for communication of information.

59. The method of claim 44, wherein in the redundant storage virtualization controller pair, each of the storage virtualization controllers further comprises: a central processing circuitry for performing TO operations in response to TO requests of said host entity; at least one IO device interconnect controller coupled to said central processing circuitry; at least one host-side IO device interconnect port provided in a said at least one IO device interconnect controller for coupling to said host entity; and at least one device-side IO device interconnect port provided in a said at least one IO device interconnect controller coupled to said PSD array through a point-to-point serial-signal interconnect.

60. The method of claim 59, wherein a said host-side IO device interconnect port and a said device-side I/O device interconnect port are provided in the same IO device interconnect controller.

61. The method of claim 59, wherein a said host-side IO device interconnect port and a said device-side IO device interconnect port are provided in different said IO device interconnect controllers.

62. The SVS of claim 1, wherein said second data path and said third data path between said first enclosure and said second enclosure are configured as a fourth pair of redundant data paths and are contained in an another single cable such that data path redundancy between said SVCs and said PSD array can be achieved by said another single cable.

63. The computer system of claim 23, wherein said second data path and said third data path between said first enclosure and said second enclosure are configured as a fourth pair of redundant data paths and are contained in an another single cable such that data path redundancy between said SVCs and said PSD array can be achieved by said another single cable.

64. The method of claim 43, wherein said second data path and said third data path between said fast enclosure and said second enclosure are configured as a fourth pair of redundant data paths and are contained in an another single cable such that data path redundancy between said SVCs and said PSD array can be achieved by said another single cable.

* * * * *